US012462094B2

(12) United States Patent
Xie et al.

(10) Patent No.: US 12,462,094 B2
(45) Date of Patent: Nov. 4, 2025

(54) LENGTH-CONTROLLED TEXT GENERATION USING A TEXT PROCESSING MODEL

(71) Applicant: Microsoft Technology Licensing, LLC, Redmond, WA (US)

(72) Inventors: Yujia Xie, Redmond, WA (US); Lesly Sadiht Miculicich Werlen, Kirkland, WA (US); Song Wang, Bellevue, WA (US); Pengcheng He, Sammamish, WA (US); Yuantao Wang, Issaquah, WA (US); Wei Xiong, Bellevue, WA (US); Yanling Xiong, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 396 days.

(21) Appl. No.: 18/064,218

(22) Filed: Dec. 9, 2022

(65) Prior Publication Data

US 2024/0193350 A1    Jun. 13, 2024

(51) Int. Cl.
*G06F 40/166*  (2020.01)
*G06F 40/117*  (2020.01)
*G06F 40/284*  (2020.01)
*G06F 40/47*   (2020.01)
*G06N 20/00*   (2019.01)

(52) U.S. Cl.
CPC .......... *G06F 40/166* (2020.01); *G06F 40/117* (2020.01); *G06F 40/284* (2020.01); *G06F 40/47* (2020.01); *G06N 20/00* (2019.01)

(58) Field of Classification Search
CPC ...... G06F 40/166; G06F 40/47; G06F 40/284; G06F 40/117; G06N 20/00
See application file for complete search history.

(56) References Cited

U.S. PATENT DOCUMENTS 8,209,163 B2 *  6/2012  Suzuki ............... G06F 40/44
                                                   704/4
10,635,753 B2 *  4/2020  Shin ..................... G06N 3/08
(Continued)

FOREIGN PATENT DOCUMENTS

CN    112686044 A  *  4/2021
CN    113204616 A  *  8/2021  ......... G06F 16/3344
(Continued)

OTHER PUBLICATIONS

Baniata, et al., "A Reverse Positional Encoding Multi-Head Attention-Based Neural Machine Translation Model for Arabic Dialects", In Journal of Mathematics, vol. 10, Issue 19, Oct. 6, 2022, 25 Pages.
(Continued)

*Primary Examiner* — Bhavesh M Mehta
*Assistant Examiner* — Eunice Lee
(74) *Attorney, Agent, or Firm* — Foley IP Law, PLLC

(57) ABSTRACT

The disclosure herein describes training a text processing model to generate model output text data using input text data and a sentence count. A training data entry including input text data and output text data is obtained. A sentence count of the output text data is determined, and the output text data is labeled with a sentence count label and a sentence number label. Model output text data is generated with a text processing model using the input text data and determined sentence count as input data. Loss data associated with a difference between the generated model output text data and the labeled output text data is used to adjust the text processing model, which enables the model to be trained to produce output text data with a target sentence count in a computationally efficient manner.

18 Claims, 10 Drawing Sheets

(56) References Cited

U.S. PATENT DOCUMENTS

| | | | |
|---|---|---|---|
| 11,423,680 B1 * | 8/2022 | Jade | G06F 16/353 |
| 11,551,013 B1 * | 1/2023 | Gupta | G06F 40/40 |
| 2020/0097554 A1 * | 3/2020 | Rezagholizadeh | G06N 3/08 |

FOREIGN PATENT DOCUMENTS

| | | | | |
|---|---|---|---|---|
| CN | 110135582 B * | 9/2022 | | G06N 3/08 |
| CN | 115769219 A * | 3/2023 | | G06F 3/14 |
| JP | 2004334382 A | 11/2004 | | |
| JP | 4248549 B2 | 4/2009 | | |
| WO | WO-2021010203 A1 * | 1/2021 | | G06N 3/045 |

OTHER PUBLICATIONS

Chan, et al., "Controllable summarization with constrained markov decision process", In Journal of Transactions of the Association for Computational Linguistics, Nov. 5, 2021, pp. 1213-1232.

He, et al., "Ctrlsum: Towards generic controllable text summarization", In Repository of arXiv:2012.04281v1, Dec. 8, 2020, 35 Pages.

Liu, et al., "Length Control in Abstractive Summarization by Pretraining Information Selection", In Proceedings of the 60th Annual Meeting of the Association for Computational Linguistics, vol. 1, May 22, 2022, pp. 6885-6895.

Niehues, Jan, "Machine Translation with Unsupervised Length-Constraints", In Repository of arXiv:2004.03176v1, Apr. 7, 2020, 10 Pages.

Oka, et al., "Length-constrained Neural Machine Translation using Length Prediction and Perturbation into Length-aware Positional Encoding", In Journal of Natural Language Processing, vol. 28, Issue 3, Sep. 15, 2021, pp. 778-801.

Vashisht, Ashutosh, "SumBasic algorithm for text summarization", Retrieved From: https://iq.opengenus.org/sumbasic-algorithm-for-text-summarization/, Retrieved Date: Oct. 31, 2022, 13 Pages.

Wu, et al., "Gamma Sampling: Fine-Grained Controlling Language Models Without Training", In Repository of arXiv:2205.06036v2, Sep. 6, 2022, 20 Pages.

* cited by examiner

LENGTH-CONTROLLED TEXT GENERATION USING A TEXT PROCESSING MODEL

BACKGROUND

Many text generation tasks benefit from accurately controlling the text length of the output text. For example, in text summarization tasks, summaries of differing lengths and/or granularities are requested. In examples with text translation tasks, it is often desired that the translated texts have the same or similar layout as the source texts, such that it is advantageous for the lengths to remain the same between the source text and the output text. However, in many cases, limiting the output of text processing models can result in output text that is inaccurate or that otherwise includes unnatural phrasing or other patterns.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for training a text processing model is described. A training data entry including input text data and output text data is obtained. A sentence count of the output text data is determined, and the output text data is labeled with a sentence count label and a sentence number label using the determined sentence count. Model output text data is generated with a text processing model using the input text data and determined sentence count as input data. Loss data associated with a difference between the generated model output text data and the labeled output text data is determined and the text processing model is adjusted using the determined loss data, whereby the text processing model is fine-tuned using the obtained training data entry.

A computerized method for using a trained text processing model is described. Input text data is received, and a sentence count is obtained. Model output text data is generated with the text processing model using the input text data and the obtained sentence count as input data. A sentence count label and a sentence number label are removed from the generated model output text data to form unlabeled model output text data and the unlabeled model output text data is provided in response to the received input text data.

Further, a computerized method for training a text processing model is described. A training data entry including input text data and output text data is obtained. A token count of the output text data is determined. An input embedding is generated by an input embedding layer of the text processing model using the input text data as input data. An output position embedding is generated by a position embedding layer of the text processing model using the determined token count and reversed position values of tokens in the output text data. The generated input embedding is combined with the generated output position embedding into a combined output encoding. Model output text data is generated by an encoder layer and a decoder layer of the text processing model using the combined output encoding as input data. Loss data associated with a difference between the generated model output text data and the output text data is determined and the text processing model, including the position embedding layer, is adjusted using the determined loss data, whereby the text processing model is fine-tuned using the obtained training data entry.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 10, the systems are illustrated as schematic drawings. The drawings may not be to scale.

DETAILED DESCRIPTION

Figure 1:
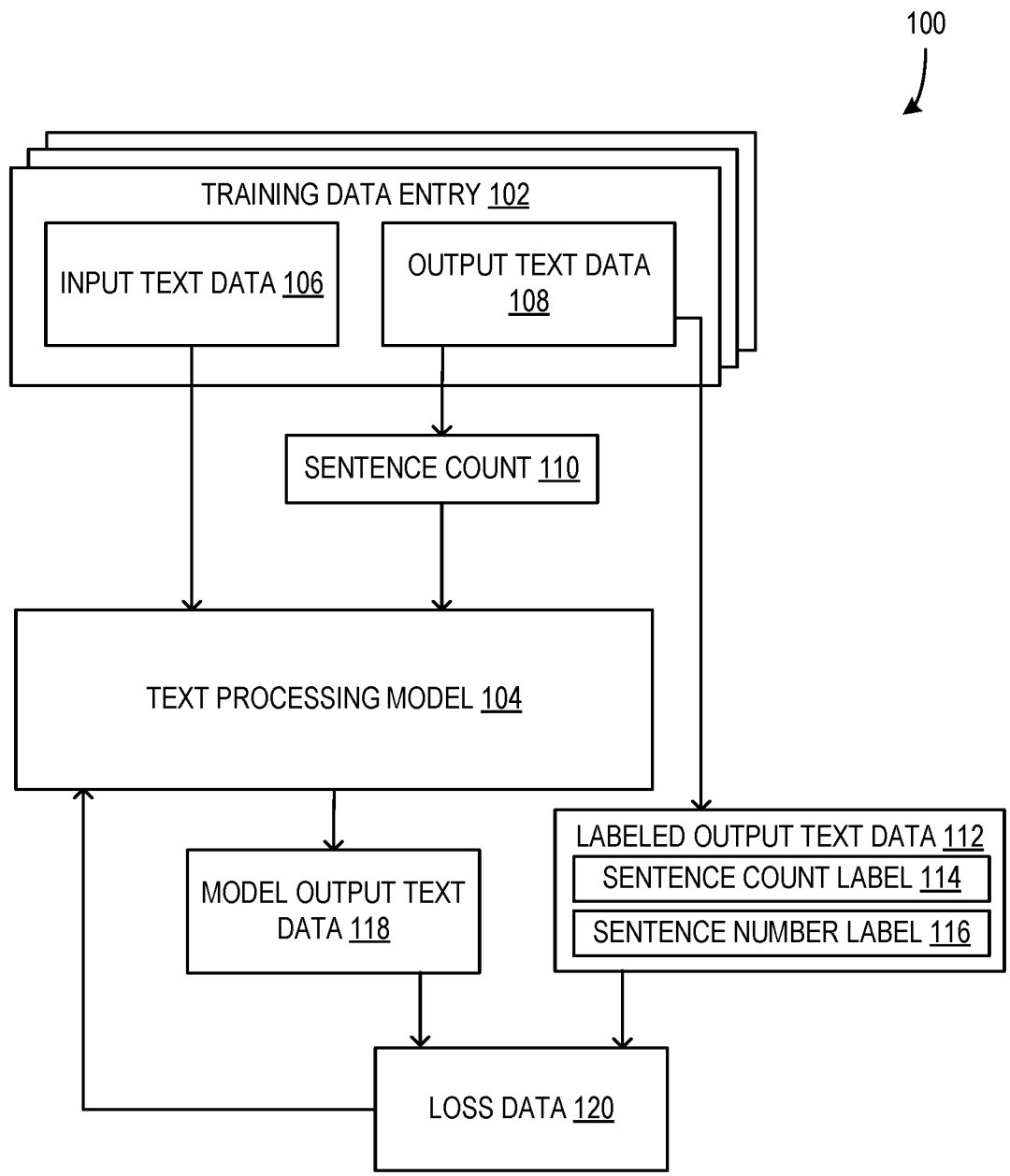
FIG. 1 is a block diagram illustrating a system configured for training a text processing model to generate model output text data controlled by sentence count.

Aspects of the disclosure provide a computerized method and system for training and using a text processing model to generate model output text data using text input data and a provided sentence count or token count. The disclosure describes training the model using training data entries with input text data and associated output text data. A sentence count of the output text data is determined, and the text processing model is used to generate model output text data using the input text data and the determined sentence count as input data. The model output text data is compared to the output text data, which has been labeled with sentence count information, and loss data is determined based on identified differences. The text processing model is adjusted based on the determined loss data using machine learning techniques, whereby the text processing model is fine-tuned using the training data entry. Further, in other examples, the text processing model is trained to use a token count instead of a sentence count as described herein.

The disclosure operates in an unconventional manner at least by including special characters associated with sentence count and sentence number in the training data in order to train the text processing model to use those special characters for sentence quantity control of output. The training process uses machine learning techniques over many iterations to cause the text processing model to produce output text with a sentence count that aligns with the sentence count provided as input. Further, because the training data includes output text data that includes natural phrasing and/or other patterns for text with particular sentence counts, the text processing model is trained to generate output text with a specific quantity of sentences that includes text patterns that are cohesive and natural. The use of the described sentence count label and/or sentence number labels influence the training process in this manner in a computationally efficient manner.

Further, the disclosure describes training a text processing model to generate output text that includes a specific quantity of tokens by using reversed position values. The reversed position values are encoded and combined with the input data during transformation of the data by the text processing model, such that the positions of tokens within the text data affects how the model transforms the data. The reversed position values inherently provide information regarding how many more tokens should be included in the output data at any particular point during the generation of the output text data. As a result, the model is trained to generate output text with an accurate quantity of tokens and with natural phrasing and/or other text patterns based on that quantity of tokens. The use reversed position values in place of position values in a regular order provides accurate token count control of output text in a way that is more computationally efficient and resource efficient than other methods that purport to control for quantities of tokens in model output.

Additionally, the disclosure enables the use of sentence count prediction models and token count prediction models to generate predicted sentence counts and predicted token counts, respectively. These predicted values can be used in place of the sentence count and/or token count input to cause the text processing models to generate length-controlled output text based on patterns present in the training data. Thus, the described text processing models can be used to generate accurate output text even in situations where a target sentence count or target token count are not provided as input.

Further, the prediction models can be trained in parallel with the text processing models and they can even share encoder layers. This enables the disclosure to train and use the combined models in a manner that is very efficient with respect to data storage and/or computation resources being used (the processing performed by the encoder layers can be done once and the resulting output can be used by both the text processing model and the associated prediction model during the training process).

Additionally, the described capabilities of the disclosure to control the sentence count and/or token count of output of the models can reduce the consumption and use of network bandwidth, computation resources, and memory resources when those length-control outputs are generated and transferred over network connections or the like. This represents an improvement over other systems that do not include such controls, which may use many more of such resources during operation.

FIG. 1 is a block diagram illustrating a system 100 configured for training a text processing model 104 to generate model output text data 118 controlled by sentence count 110. The system 100 uses training data entries 102 comprised of input text data 106 and associated output text data 108 to train the text processing model 104. For each training data entry 102, the input text data 106 and a sentence count 110 of the output text data 108 are provided to the text processing model 104 as input data. The text processing model 104 generates model output text data 118. The model output text data 118 is compared to labeled output text data 112 generated from the output text data 108 to determine loss data 120. The determined loss data 120 is then used to adjust weight values or other aspects of the text processing model 104 to improve the accuracy of generated model output text data 118 with respect to labeled output text data 112 during future iterations.

Figure 10:
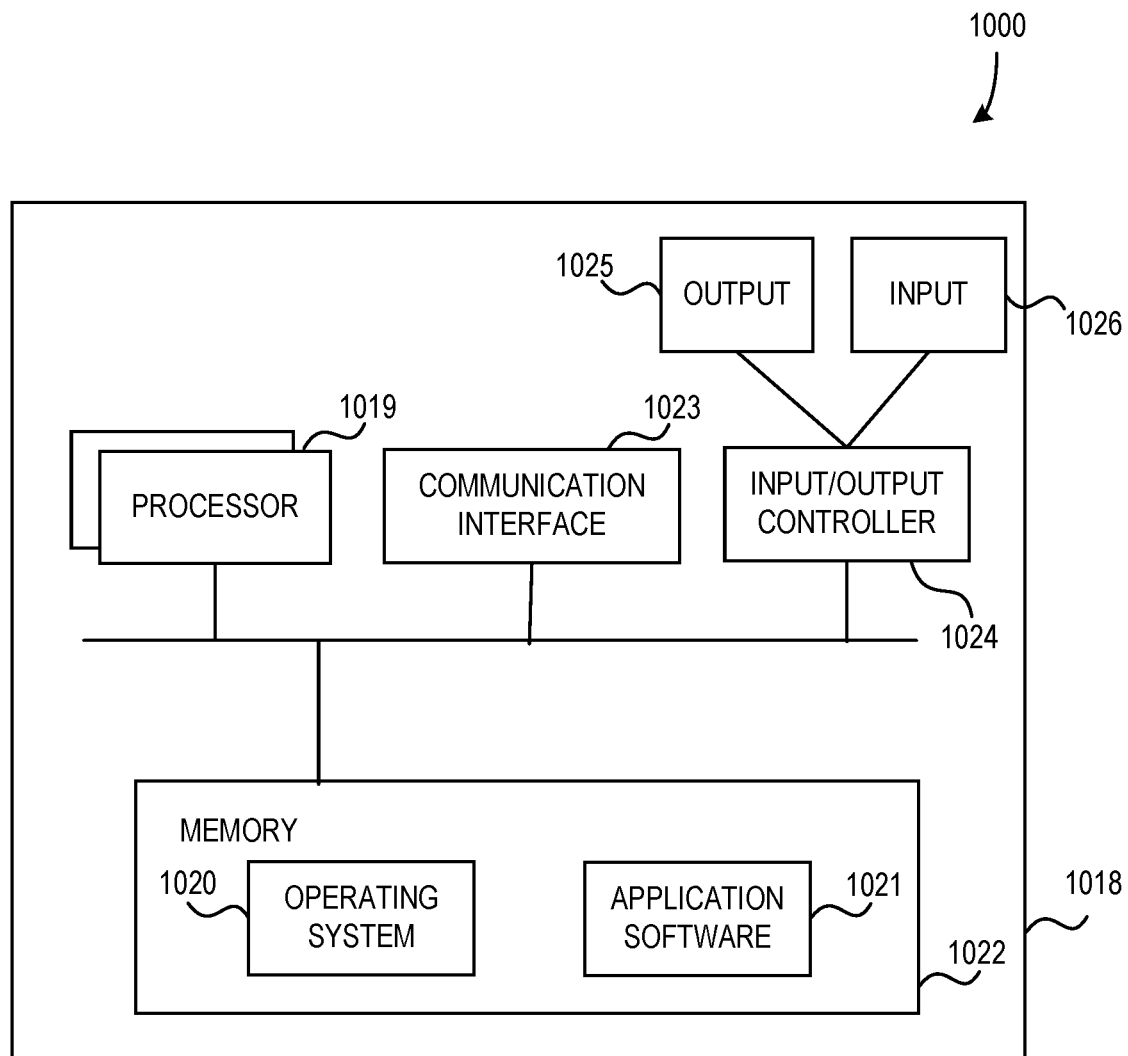
FIG. 10 illustrates an example computing apparatus as a functional block diagram.

In some examples, the system 100 includes a computing device (e.g., the computing apparatus of FIG. 10). Further, in some examples, the system 100 includes multiple computing devices that are configured to communicate with each other via one or more communication networks (e.g., an intranet, the Internet, a cellular network, other wireless network, other wired network, or the like). In some such examples, entities of the system 100 are configured to be distributed between the multiple computing devices and to communicate with each other via network connections. For instance, in an example, the training data entries 102 are stored on a different computing device than the computing device that is executing operations of the text processing model 104 and those computing devices are configured to communicate with each other via network connections as described herein. In other examples, other organizations or arrangements of computing devices are used to implement some or all of the system 100 without departing from the description.

Further, in some examples, the text processing model 104 is a model that is trained using machine learning techniques. For instance, in some such examples, the text processing model 104 uses a transformer-based machine learning technique (e.g., Bidirectional Encoder Representations from Transformers (BERT)). In such examples, the text processing model 104 includes a transformer language model with a plurality of encoder layers and self-attention heads that enable the model 104 to perform text processing tasks such as translation and/or summarization. Additionally, in some such examples, the text processing model 104 is pre-trained to process and/or model language generally and the training processes performed by system 100 as described herein are fine-tuning the text processing model 104 to generate output text data that is controlled by a sentence count provided as input. It should be understood that, in other examples, the text processing model 104 is configured as other types of machine learning-based models without departing from the description.

The text processing model 104 includes hardware, firmware, and/or software that is configured to generate output text data 118 using the input text data 106 and sentence count 110 as described herein. Further, the text processing model 104 is configured to enable adjustment of its performance based on loss data 120. In some examples, the text processing model 104 includes encoding layers, decoding layers, and/or transformer layers that are configured to perform operations on input data to generate output data. The adjustments to the text processing model 104 based on the loss data 120 include the adjustment of weight values or other aspects of those layers, such that the operations performed by those layers during future iterations are changed. By performing many such training iterations with the text processing model 104, the accuracy of the model 104 to generate model output text data 118 that closely corresponds to the labeled output text data 112 is improved.

In some examples, such training iterations are performed with the text process model 104 until the accuracy of its performance at generating model output text data 118 falls within an allowable threshold of inaccuracy (e.g., the model 104 is trained until it reliably generates model output text data 118 that is 98% accurate with respect to the associated labeled output text data 112).

Further, in some examples, the text processing model 104 is configured as a summarization model that is configured to generate output text data 118 that includes a summary of the content of the input text data 106. Additionally, or alternatively, the text processing model 104 is configured as a translation model that is configured to translate the input text data 106 from a first language to generated output text data 118 in a second language. In such examples, the training data entries 102 used to train the text processing model 104 include paired input text data 106 and output text data 108 that are representative of the configured purpose of the text processing model 104. For instance, in an example where the model 104 is a translation model, a training data entry 102 includes input text data 106 in a first language and output text data 108 that includes equivalent text in a second language. Alternatively, in an example where the model 104 is a summarization model, a training data entry 102 includes input text data 106 in the form of an article, book, or other body of text and output text data 108 in the form of a summary of the input text data 106. The training data entries 102 are described further below. In other examples, the text processing model 104 is configured as other types of models without departing from the description.

The training data entries 102 that are used to train the text processing model 104 include input text data 106 and output text data 108. In some examples, the input text data 106 of a training data entry 102 is associated with the output text data 108 of the same training data entry 102, indicating that the output text data 108 represents a desired output of the text processing model 104 when the model 104 is given the input text data 106 as input data. Further, in some examples, the training data entries 102 are collected or otherwise obtained from existing examples of paired text data and/or generated for use as training data manually and/or through an automated process. For instance, in an example where the text processing model 104 is configured to generate summaries of news articles, a training data entry 102 includes input text data 106 in the form of a news article and output text data 108 in the form of a summary of that news article. Alternatively, or additionally, in an example where the text processing model 104 is configured to translate text from a first language to a second language, a training data entry 102 includes input text data 106 in the form of text in the first language and output text data in form of equivalent text in the second language.

The system 100 is configured to determine a sentence count 110 of the output text data 108 for use in training the text processing model 104. In some examples, the system 100 analyzes the output text data 108 to identify individual sentences therein and counts the identified sentences to arrive at the sentence count 110. In some such examples, the system 100 identifies sentences in the output text data 108 based on punctuation within the output text data 108 and/or based on other patterns present in the output text data 108. For instance, in some examples, the system 100 identifies sentences in the output text data 108 based on the presence of periods, question marks, exclamation marks, or other punctuation marks that mark the termination of sentences in the language for which the text processing model 104 and system 100 in general are configured. In other examples, other patterns in the output text data 108 are used to identify sentences therein without departing from the description.

The sentence count 110 is provided to the text processing model 104 and the sentence count 110 is used in combination with the input text data 106 to generate the model output text data 118. In some examples, the input text data 106 is encoded by the text processing model 104 and that encoded data is then transformed by the model 104. The transformed data is then decoded into the model output text data 118 using machine learning model techniques as described herein. In some such examples, the sentence count 110 is encoded and/or otherwise combined with the input text data 106 before or after the text data 106 is encoded, such that the model 104 has access to data representative of the sentence count 110 when generating the model output text data 118. Through iterative training, the text process model 104 learns to generate model output text data 118 that includes a quantity of sentences that align with the sentence count 110 provided to the text processing model 104 as input.

In some examples, the training of the text processing model 104 is performed using loss data 120, which is determined based on differences between the generated model output text data 118 and the labeled output text data 112. The labeled output text data 112 includes a sentence count label 114 and one or more sentence number labels 116. These labels are used through training iterations to teach the text processing model 104 to generate model output text data 118 that includes the quantity of sentences indicated by the sentence count 110 and that generates sentences in such a way that the target quantity of sentences is attended to or accounted for. For instance, in an example where the sentences in the middle of instances of output text data 108 tend to have different patterns than sentences at the end of instances of output text data 108, the presence of the labels 114 and 116 in the labeled output text data 112 is used to teach the text processing model 104 to generate those differing patterns of sentences at the corresponding sentence locations within generated model output text data 118.

The loss data 120 reflects differences between the generated model output text data 118 and corresponding labeled output text data 112. In some examples, the loss data 120 is generated or otherwise obtained by comparing encoded versions of the data of the generated model output text data 118 and the labeled output text data 112. Further, in some such examples, the loss data 120 is a data value or data values (e.g., a float number) that can be used to adjust weights and/or other values used by the text processing model 104 to transform input text data into generated model output text data 118. In some such examples, layers that are adjusted based on the loss data 120 include layers configured to encode text data into data vectors, encodings, embeddings, or the like, layers configured to transform data vectors, and/or layers configured to decode data vectors into text data. In other examples, the text processing model 104 includes more, fewer, or different types of layers that are adjusted based on the loss data 120 as part of the training process without departing from the description.

In some examples, the sentence count label 114 is text data in the form of a special character (e.g., a text character that is not used as a letter, digit, punctuation, or the like) combined with a numeric value that indicates the quantity of sentences in the labeled output text data 112, i.e., the sentence count 110. In some such examples, the sentence count label 114 is inserted into the output text data 108 at the beginning of the text data to form the labeled output text data. However, in other examples, the sentence count label 114 is included in the labeled output text data 112 in other ways without departing from the description.

Similarly, in some examples, the sentence number label 116 is text data in the form of the same special character or a different special character combined with a numeric value that indicates the number of the current sentence (e.g., the first sentence is indicated using a '1', the second sentence is indicated using a '2'). For output text data 108 that includes more than one sentence, the quantity of sentence number labels 116 in the labeled output text data 112 is equal to the quantity of sentences in the labeled output text data 112. Further, in some such examples, a sentence number label 116 of a sentence is inserted or otherwise added to the labeled output text data 112 at the beginning of the corresponding sentence. However, in other examples, the sentence number label(s) 116 are included in the labeled output text data 112 in other ways without departing from the description.

For instance, in an example, the sentence count label 114 and sentence number label 116 use a '§ ' character as the special character. An example of a labeled output text data 112 is "§ 3 § 1 Nearly 40 endangered forest elephants were killed in two parks. § 2 Poachers on horseback are believed to be responsible. § 3 Forest and savanna elephant populations have declined drastically." In this examples, the first '§ 3' is the sentence count label 114 indicating that the text data 112 includes three sentences. The other three uses of the special character, § 1. § 2, and § 3, are sentence number labels 116 indicating the relative number of the sentence following the label with respect to the text data 112 (e.g., '§ 1' indicates the first sentence of the text data 112 and '§ 2' indicates the second sentence of the text data 112).

Additionally, or alternatively, in other examples, the labeled output text data 112 is generated by including sentence number labels 116 with each sentence therein, but using the reversed sentence numbers, such that the first sentence of the labeled output text data 112 is labeled with the value of the sentence count 110 and each subsequent sentence is labeled with a decremented value, such that the sentence number labels 116 count down throughout the labeled output text data 112 until the last sentence is reached with an associated sentence number label 116 value of '0' or '1'. In this way, the sentence count 110 of the output text data 108 is embedded within the labeled output text data 112 without using the sentence count label 114.

Figure 2:
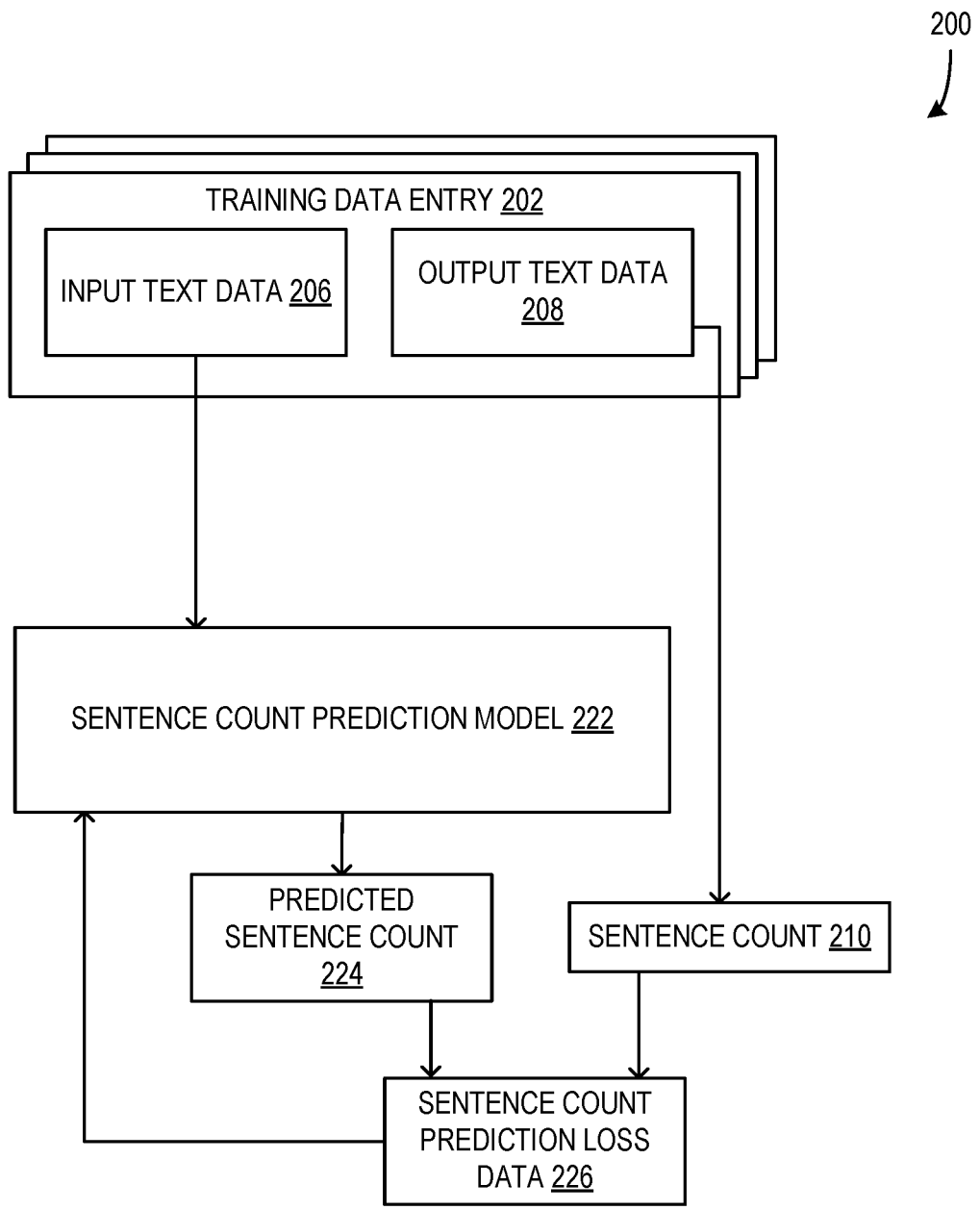
FIG. 2 is a block diagram illustrating a system configured for training a sentence count prediction model to generate a predicted sentence count.

FIG. 2 is a block diagram illustrating a system 200 configured for training a sentence count prediction model 222 to generate a predicted sentence count 224. The system 200 uses training data entries 202 comprised of input text data 206 and associated output text data 208 to train the sentence count prediction model 222. For each training data entry 202, the input text data 206 is provided to the sentence count prediction model 222 as input data. The sentence count prediction model 222 generates a predicted sentence count 224. The predicted sentence count 224 is compared to the sentence count 210 of the output text data 208 to determine sentence count prediction loss data 226. The determined sentence count prediction loss data 226 is then used to adjust weight values or other aspects of the sentence count prediction model 222 to improve the accuracy of predicted sentence counts 224 with respect to sentence counts 210 of output text data 208 during future iterations.

In some examples, the system 200 includes a computing device (e.g., the computing apparatus of FIG. 10). Further, in some examples, the system 200 includes multiple computing devices that are configured to communicate with each other via one or more communication networks (e.g., an intranet, the Internet, a cellular network, other wireless network, other wired network, or the like). In some such examples, entities of the system 200 are configured to be distributed between the multiple computing devices and to communicate with each other via network connections. For instance, in an example, the training data entries 202 are stored on a different computing device than the computing device that is executing operations of the sentence count prediction model 222 and those computing devices are configured to communicate with each other via network connections as described herein. In other examples, other organizations or arrangements of computing devices are used to implement some or all of the system 200 without departing from the description.

Further, in some examples, the sentence count prediction model 222 is a model that is trained using machine learning techniques. For instance, in some such examples, the sentence count prediction model 222 uses an encoder concatenated with a regressor head. In such examples, the sentence count prediction model 222 includes a transformer language model that enables the model 222 to perform text recognition tasks and predict a sentence count based on those tasks. Additionally, in some such examples, the sentence count prediction model 222 is pre-trained to process and/or model language generally and the training processes performed by system 200 as described herein are fine-tuning the sentence count prediction model 222 to generate predicted sentence counts 224. It should be understood that, in other examples, the sentence count prediction model 222 is configured as other types of machine learning-based models without departing from the description.

The sentence count prediction model 222 includes hardware, firmware, and/or software that is configured to generate predicted sentence counts 224 using the input text data 206 as described herein. Further, the sentence count prediction model 222 is configured to enable adjustment of its performance based on sentence count prediction loss data 226. In some examples, the sentence count prediction model 222 includes encoding layers, regressor layers, and/or other types of model layers that are configured to perform operations on input data to generate output data. The adjustments to the sentence count prediction model 222 based on the sentence count prediction loss data 226 include the adjustment of weight values or other aspects of those layers, such that the operations performed by those layers during future iterations are changed. By performing many such training iterations with the sentence count prediction model 222, the accuracy of the model 222 to generate predicted sentence counts 224 that closely correspond to the sentence counts 210 of output text data 208 is improved. In some examples, such training iterations are performed with the sentence count prediction model 222 until the accuracy of its performance at generating predicted sentence counts 224 falls within an allowable threshold of inaccuracy (e.g., the model 222 is trained until it reliably generates predicted sentence counts 224 that are 99.9% accurate with respect to the associated sentence counts 210).

It should be understood that the sentence count 210 of output text data 208 is the same as the sentence count 110 of output text data 108 as described above with respect to system 100 of FIG. 1. Further, the determination or generation of the sentence count 210 is performed in substantially the same way as the determination of sentence count 110. In some such examples, the sentence count 210) is a numerical value or other indicator of the quantity of sentences that are in the output text data 208.

In some examples, the training of the sentence count prediction model 222 is performed using sentence count prediction loss data 226, which is determined based on differences between the predicted sentence count 224 and the sentence count 210 of the output text data 208. The use of sentence count 210 as feedback data for training the sentence count prediction model 222 over many iterations trains the sentence count prediction model 222 to be able to accurately predict an appropriate or desirable quantity of sentences of output text data based on provided input text data. Further, in some such examples, the loss data 120 is a value, set of values, and/or set data vectors or other data structures that can be used to adjust weights and/or other values used by the sentence count prediction model 222 to transform input text data into a predicted sentence count 224. In some such examples, layers that are adjusted based on the sentence count prediction loss data 226 include layers configured to encode text data into data vectors, encodings, embeddings, or the like, layers configured to transform data vectors, and/or layers generate predicted sentence counts 224 from encoded and/or transformed data vectors. In other examples, the sentence count prediction model 222 includes more, fewer, or different types of layers that are adjusted based on the sentence count prediction loss data 226 as part of the training process without departing from the description.

Figure 3:
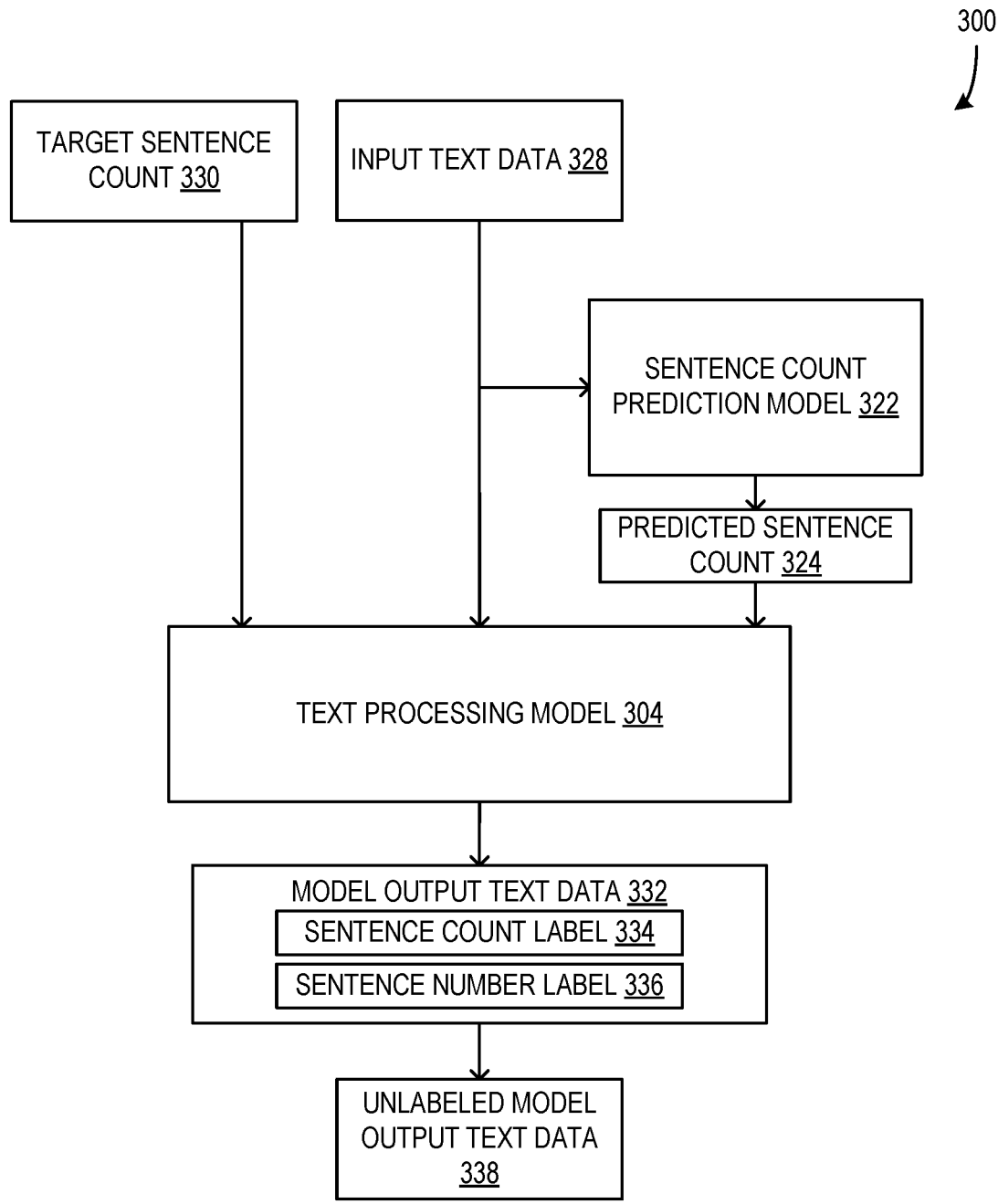
FIG. 3 is a block diagram illustrating a system configured for using a text processing model to generate unlabeled model output text data using input text data and a sentence count.

FIG. 3 is a block diagram illustrating a system 300 configured for using a text processing model 304 to generate unlabeled model output text data 338 using input text data 328 and a sentence count (e.g., a target sentence count 330 or a predicted sentence count 324). In some examples, the text processing model 304 has been trained as described herein with respect to the text processing model 104 of FIG. 1. Further, in some examples, the sentence count prediction model 322 has been trained as described herein with respect to the sentence count prediction model 222 of FIG. 2.

The text processing model 304 includes hardware, firmware, and/or software configured to receive input text data 328 and a sentence count, such as a target sentence count 330 or a predicted sentence count 324, as input and to generate model output text data 332 as described herein. In some examples, the system 300 receives a target sentence count 330 as input from the same source or a different source from which the input text data 328 is received and the text processing model 304 is configured to use that target sentence count 330. For instance, in one example, the target sentence count 330) is included in a request with the input text data 328 while, in another example, the target sentence count 330 is a defined parameter of the system 300. However, in other examples, no target sentence count 330 is provided and the system 300 is configured use the input text data 328 as input to the sentence count prediction model 322, which is configured to generate a predicted sentence count 324 therefrom for use as input to the text processing model 304. In still other examples, the selection of a target sentence count 330 or a predicted sentence count 324 for use with the text processing model 304 is done using other methods (e.g., a user of the system 300 selects between the two options when both are available, the system 300 prioritizes a target sentence count 330 over a predicted sentence count 324 when the target sentence count 324 is available, or the like). It should be understood that, in some examples, the use of a target sentence count 330 targets a different application of the described text processing model 304 than the use of the sentence count prediction model 322 to generate the predicted sentence count 324 and, as a result, systems configured to use a target sentence count 330 do not include the sentence count prediction model 322, while systems configured to use the sentence count prediction model 322 do not obtain a target sentence count 330 as input.

Further, the text processing model 304 is configured to generate model output text data 332 that includes a sentence count label 334 and a sentence number label or labels 336. In some examples, the model output text data 332 is generated in substantially the same way as the generated model output text data 118 is generated by the text processing model 104 of FIG. 1. Further, the sentence count label 334 and sentence number label(s) 336 are formatted or otherwise included in substantially the same way as the sentence count label 114 and sentence number label(s) 116 are included in the labeled output text data 112 of FIG. 1. Because the text processing model 304 was trained using output text data that included such labels as feedback data, the text processing model 304 is now configured to generate model output text data 332 that also includes those labels 334 and 336.

In some examples, the system 300 is further configured to remove the labels 334 and 336 from the generated model output text data 332 to form unlabeled model output text data 338. In some such examples, because the labels 334 and 336 are denoted in the generated model output text data 332 using special characters or the like, the system 300 is configured to identify those special characters within the generated model output text data 332 and to remove the identified special characters and associated numeric values therefrom. It should be understood that, in most examples, the sentence count labels 334 and sentence number labels 336 are artifacts of training the text processing model 304 and that the desired output of the system 300 is the unlabeled model output text data 338. For instance, in an example where the text processing model 304 is configured to generate a summary of the text in the input text data 328, the output of the system 300 is the unlabeled model output text data 338 which includes the summary text of the input text data 328 without any labels 334 or 336 being present at the beginning of the text or between sentences of the text.

Figure 4:
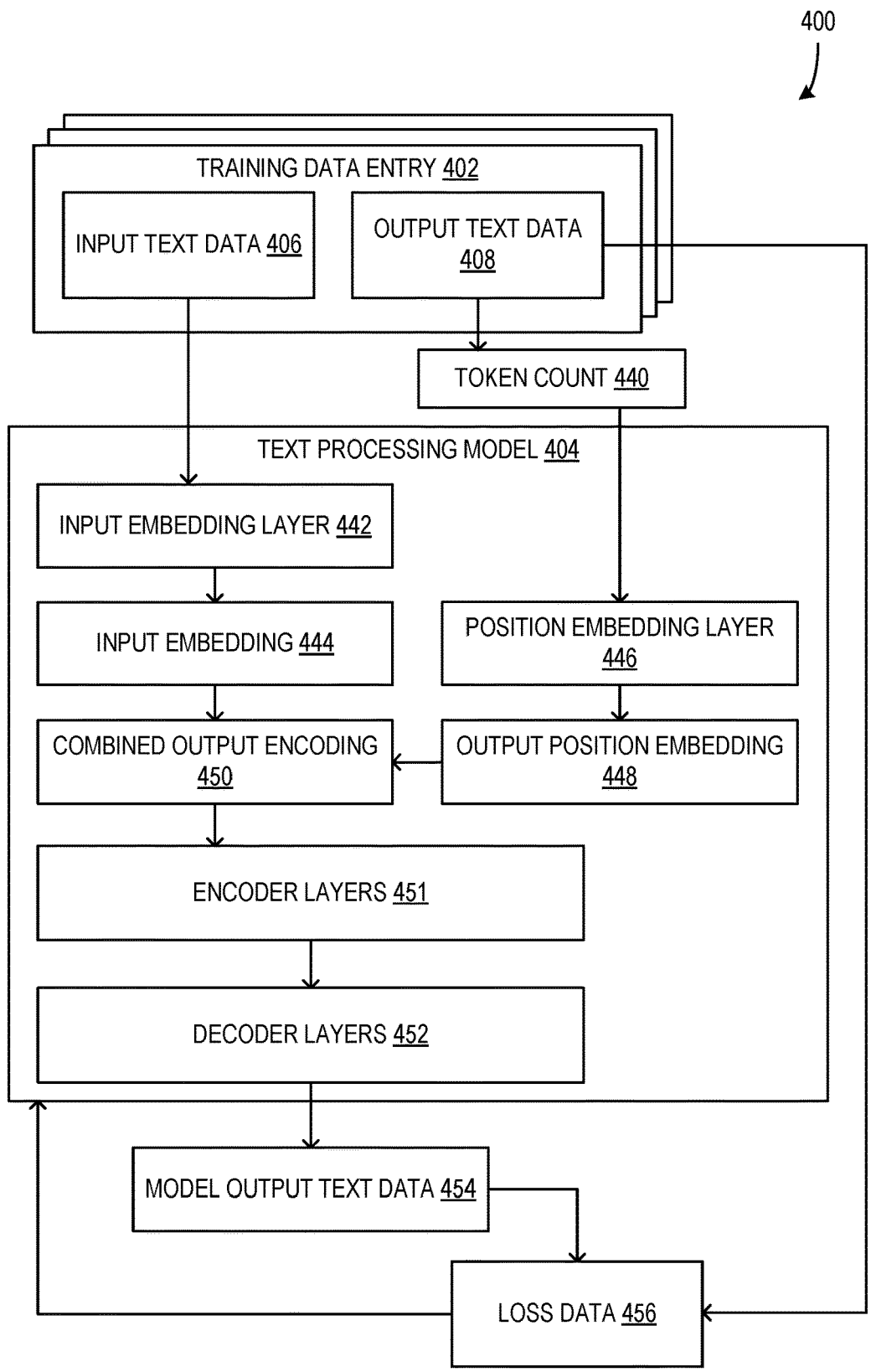
FIG. 4 is a block diagram illustrating a system configured for training a text processing model to generate model output text data controlled by token count.

FIG. 4 is a block diagram illustrating a system 400 configured for training a text processing model 404 to generate model output text data 454 controlled by token count 440. The system 400 uses training data entries 402 comprised of input text data 406 and associated output text data 408 to train the text processing model 404. For each training data entry 402, the input text data 406 and a token count 440 of the output text data 408 are provided to the text processing model 404 as input data. The text processing model 404 generates model output text data 454. The model output text data 454 is compared to the output text data 408 to determine loss data 456. The determined loss data 456 is then used to adjust weight values or other aspects of the text processing model 404 to improve the accuracy of generated model output text data 454 with respect to output text data 408 during future iterations.

In some examples, the system 400 includes a computing device (e.g., the computing apparatus of FIG. 10). Further, in some examples, the system 400 includes multiple computing devices that are configured to communicate with each other via one or more communication networks (e.g., an intranet, the Internet, a cellular network, other wireless network, other wired network, or the like). In some such examples, entities of the system 400 are configured to be distributed between the multiple computing devices and to communicate with each other via network connections. For instance, in an example, the training data entries 402 are stored on a different computing device than the computing device that is executing operations of the text processing model 404 and those computing devices are configured to communicate with each other via network connections as described herein. In other examples, other organizations or arrangements of computing devices are used to implement some or all of the system 400 without departing from the description.

Further, in some examples, the text processing model 404 is a model that is trained using machine learning techniques. For instance, in some such examples, the text processing model 404 uses a transformer-based machine learning technique (e.g., Bidirectional Encoder Representations from Transformers (BERT)). In such examples, the text processing model 404 includes a transformer language model with a plurality of encoder layers 451 and decoder layers 452 with self-attention heads that enable the model 404 to perform text processing tasks such as translation and/or summarization. Additionally, in some such examples, the text processing model 404 is pre-trained to process and/or model language generally and the training processes performed by system 400 as described herein are fine-tuning the text processing model 404 to generate output text data 454 that is controlled by a token count 440 provided as input. It should be understood that, in other examples, the text processing model 404 is configured as other types of machine learning-based models without departing from the description.

The text processing model 404 includes hardware, firmware, and/or software that is configured to generate output text data 454 using the input text data 406 and token count 440 as described herein. Further, the text processing model 404 is configured to enable adjustment of its performance based on loss data 456. In some examples, the text processing model 404 includes encoder layers 451, decoder layers 452, input embedding layers 442, position embedding layers 446 and/or other transformer layers that are configured to perform operations on input data to generate output data. The adjustments to the text processing model 404 based on the loss data 456 include the adjustment of weight values or other aspects of those layers, including adjusting the position embedding layer 446, such that the operations performed by those layers during future iterations are changed. By performing many such training iterations with the text processing model 404, the accuracy of the model 404 to generate model output text data 454 that closely corresponds to the output text data 408 is improved. In some examples, such training iterations are performed with the text process model 404 until the accuracy of its performance at generating model output text data 454 falls within an allowable threshold of inaccuracy (e.g., the model 404 is trained until it reliably generates model output text data 454 that is 98% accurate with respect to the associated output text data 408).

Further, in some examples, the text processing model 404 is configured as a summarization model that is configured to generate output text data 454 that includes a summary of the content of the input text data 406. Additionally, or alternatively, the text processing model 404 is configured as a translation model that is configured to translate the input text data 406 from a first language to generated output text data 454 in a second language. In such examples, the training data entries 402 used to train the text processing model 404 include paired input text data 406 and output text data 408 that are representative of the configured purpose of the text processing model 404. For instance, in an example where the model 404 is a translation model, a training data entry 402 includes input text data 406 in a first language and output text data 408 that includes equivalent text in a second language. Alternatively, in an example where the model 404 is a summarization model, a training data entry 402 includes input text data 406 in the form of an article, book, or other body of text and output text data 408 in the form of a summary of the input text data 406. The training data entries 402 are described further below. In other examples, the text processing model 404 is configured as other types of models without departing from the description.

The training data entries 402 that are used to train the text processing model 404 include input text data 406 and output text data 408. In some examples, the input text data 406 of a training data entry 402 is associated with the output text data 408 of the same training data entry 402, indicating that the output text data 408 represents a desired output of the text processing model 404 when the model 404 is given the input text data 406 as input data. Further, in some examples, the training data entries 402 are collected or otherwise obtained from existing examples of paired text data and/or generated for use as training data manually and/or through an automated process. For instance, in an example where the text processing model 404 is configured to generate summaries of news articles, a training data entry 402 includes input text data 406 in the form of a news article and output text data 408 in the form of a summary of that news article. Alternatively, or additionally, in an example where the text processing model 404 is configured to translate text from a first language to a second language, a training data entry 402 includes input text data 406 in the form of text in the first language and output text data 408 in form of equivalent text in the second language.

The system 400 is configured to determine a token count 440 of the output text data 408 for use in training the text processing model 404. In some examples, the system 400 analyzes the output text data 408 to identify individual tokens therein and counts the identified tokens to arrive at the token count 440, wherein tokens are letters, groups of letters, words, symbols, or the like that make up text data and that are associated with defined token values in a token lookup table or other data structure. In some such examples, the system 400 identifies tokens in the output text data 408 based on patterns present in the output text data 408. For instance, in some examples, the system 400 identifies tokens in the output text data 408 by comparing portions of the output text data 408 to the set of defined token values. In other examples, other patterns in the output text data 408 are used to identify sentences therein without departing from the description.

The token count 440 is provided to the text processing model 404 and the token count 440) is used in combination with the input text data 406 to generate the model output text data 454. In some examples, the input text data 406 is transformed into an input embedding 444 by an input embedding layer 442. Further, in some such examples, the input embedding layer 442 is configured to use tokens of the input text data to generate token embeddings, which are pre-trained embedding data associated with specific words, characters, sets of characters, symbols, or other types of tokens. For instance, in an example, the input embedding layer 442 generates a set of token embedding data with one token embedding being generated for each token in the input text data 406.

The token count 440 is processed by the position embedding layer 446 to generate an output position embedding 448. The input embedding 444 and output position embedding 448 are then combined into a combined output encoding 450) and that encoding 450) is encoded by encoder layers 451 and decoded using decoder layers 452 into the model output text data 454. In some examples, the output position embedding 448 includes data associated with the position values of tokens of the output text data 408 in reversed order (e.g., '4, 3, 2, 1, 0' instead of '0, 1, 2, 3, 4'), such that the position values begin at a value equal to the token count 440) and decrease toward zero. The position embedding layer 446 is configured to reverse the order of the position values in this way and to then generate the output position embedding 448 based on those reverse order position values. Through iterative training, the text process model 404 learns to generate model output text data 454 that includes a quantity of tokens that align with the token count 440 provided to the text processing model 404 as input.

In some examples, the training of the text processing model 404 is performed using loss data 456, which is determined based on differences between the generated model output text data 454 and the output text data 408. The output text data 408 includes a quantity of tokens that is indicated by the token count 440. The token count 440 and associated reversed position information in the form of output position embeddings 448 are used throughout the training process to train the text processing model 404 to generate model output text data 454 that includes a quantity of tokens that matches the token count 440 provided as input. Further, the reversed position information is used to train the text processing model 404 to generate text with patterns that correspond to common text patterns of text data with a quantity of tokens that matches the token count 440. For instance, in some examples, tokens at different relative locations in a set of text data tend to follow different patterns. By providing the position information in reverse order, the text processing model 404 is enabled to use the included information indicating when the set of output text data 454 will end to more accurately generate text data patterns associated different positions within the output text data 454.

The loss data 456 reflects differences between the generated model output text data 454 and corresponding output text data 408. In some examples, the loss data 456 is generated or otherwise obtained by comparing encoded versions of the data of the generated model output text data 454 and the output text data 408. Further, in some such examples, the loss data 456 is a data value or values that can be used to adjust weights and/or other values used by the text processing model 404 to transform input text data 406 into generated model output text data 454. In some such examples, layers that are adjusted based on the loss data 456 include layers configured to encode text data or other related data into data vectors, encodings, embeddings, or the like, layers configured to transform data vectors, and/or layers configured to decode data vectors into text data. In other examples, the text processing model 404 includes more, fewer, or different types of layers that are adjusted based on the loss data 456 as part of the training process without departing from the description.

In some examples, the encoder layers 451 include multiple layers that process data from the input text data 406 iteratively, one layer after another. In each encoder layer 451, a self-attention portion is configured to draw from data associated with the entire set of tokens of the input text data 406 and, for each token, weigh the relevance of every other token in the set. The determined relevance between tokens is used to modify the values of the data (e.g., data vectors) associated with those tokens. In addition to the self-attention portion, each encoder layer includes a feed forward neural network portion to perform additional data processing and to contain residual connections and layer normalization steps. It should be understood that, in other examples, the encoder layers 451 include more, fewer, or different structures than these without departing from the description.

Further, in some examples, the input embedding layer 442 performs initial processing on the input text data 406 to obtain data vectors that represent the tokens in the input text data 406. For instance, in some examples, the input text data 406 is parsed into tokens using a list or other data structure of defined tokens and then an input embedding process is used to convert those tokens into data vectors. Additionally, or alternatively, the initial processing includes using the position embedding layer 446 to include positional information in the data vectors associated with the input text data 406. After the initial processing is complete, the resulting data vectors are provided to the multiple iterative encoder layers 451 described above, where the data vectors are processed and modified into the input encoding.

In some examples, the position embedding layer 446 is configured to use reversed position values associated with the token count 440 to generate the output position embedding 448. The position embedding layer 446 is configured to transform or translate individual position values into data vectors that are associated with those position values, where data vectors are sets of multiple values, generating the output position embedding 448, which includes the set of data vectors associated with those reversed position values. It should be understood that, in addition to the training process causing the encoder layers 451 and the decoder layers 452 to be adjusted based on the loss data 456, weights and/or other aspects of the input embedding layer 442 and the position embedding layer 446 are adjusted based on the loss data 456 to improve the input embeddings 444 and output position embeddings 448 generated by the input embedding layer 442 and the position embedding layer 446 in future iterations.

The data vectors of the output position embedding 448 are combined with the input embedding 444 to generate the combined output encoding 450. In some examples, the combination of the output position embedding 448 and the input embedding 444 includes adding values of the vectors together, but in other examples, other methods of combining the data vectors are used without departing from the description.

In some examples, the decoder layers 452 include multiple layers that process data from the combined output encoding 450 iteratively, one layer after another. In each decoder layer 452, a self-attention portion and a feed-forward neural network portion are present that operate in substantially the same way as the corresponding portions in the encoder layers 451 as described above. However, these portions of the decoder layers 452 are trained to convert data vectors of combined output encoding 450 into the model output text data 454 as described herein. Further, in some such examples, each decoder layer 452 includes an encoder-decoder attention portion that is configured to draw relevant information from the encodings generated by the encoder layers 451. It should be understood that, in other examples, the decoder layers 452 include more, fewer, or different structures than these without departing from the description.

Figure 5:
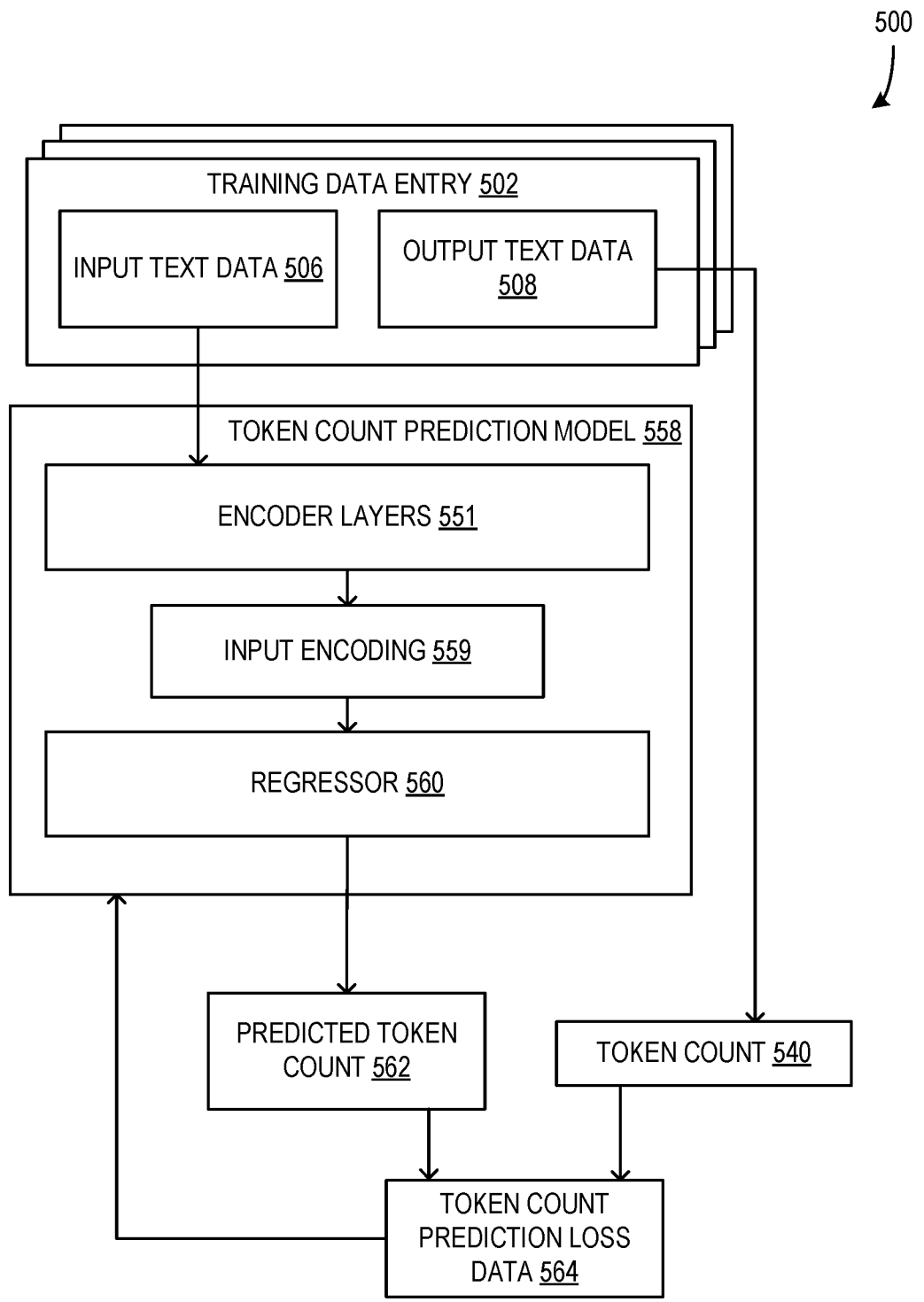
FIG. 5 is a block diagram illustrating a system configured for training a token count prediction model to generate a predicted token count.

Further, in some examples, the decoder layers 452 include a linear transformation layer and a SoftMax layer which are configured produce output probabilities over a vocabulary of tokens that are then used to generate the model output text data 454.I FIG. 5 is a block diagram illustrating a system 500 configured for training a token count prediction model 558 to generate a predicted token count 562. The system 500 uses training data entries 502 comprised of input text data 506 and associated output text data 508 to train the token count prediction model 558. For each training data entry 502, the input text data 506 is provided to the token count prediction model 558 as input data. The token count prediction model 558 generates a predicted token count 562. The predicted token count 562 is compared to the token count 540 of the output text data 508 to determine token count prediction loss data 564. The determined token count prediction loss data 564 is then used to adjust weight values or other aspects of the token count prediction model 558 to improve the accuracy of predicted token counts 562 with respect to token counts 540 of output text data 508 during future iterations.

In some examples, the system 500 includes a computing device (e.g., the computing apparatus of FIG. 10). Further, in some examples, the system 500 includes multiple computing devices that are configured to communicate with each other via one or more communication networks (e.g., an intranet, the Internet, a cellular network, other wireless network, other wired network, or the like). In some such examples, entities of the system 500 are configured to be distributed between the multiple computing devices and to communicate with each other via network connections. For instance, in an example, the training data entries 502 are stored on a different computing device than the computing device that is executing operations of the token count prediction model 558 and those computing devices are configured to communicate with each other via network connections as described herein. In other examples, other organizations or arrangements of computing devices are used to implement some or all of the system 500 without departing from the description.

Further, in some examples, the token count prediction model 558 is a model that is trained using machine learning techniques. For instance, in some such examples, the token count prediction model 558 uses encoder layers 551 concatenated with a regressor 560. The encoder layers 551 generate input encoding 559, which includes encoding data based on the input text data 506 and/or position data of tokens therein (e.g., output position embedding 448 data), which is provided as input to the regressor 560. In such examples, the token count prediction model 558 includes a transformer language model that enable the model 558 to perform text recognition tasks and predict a token count based on those tasks. Additionally, in some such examples, the token count prediction model 558 is pre-trained to process and/or model language generally and the training processes performed by system 500 as described herein are fine-tuning the token count prediction model 558 to generate predicted token counts 562. It should be understood that, in other examples, the token count prediction model 558 is configured as other types of machine learning-based models without departing from the description.

The token count prediction model 558 includes hardware, firmware, and/or software that is configured to generate predicted token counts 562 using the input text data 506 as described herein. Further, the token count prediction model 558 is configured to enable adjustment of its performance based on token count prediction loss data 564. In some examples, the token count prediction model 558 includes encoding layers, regressor layers, and/or other types of model layers that are configured to perform operations on input data to generate output data. The adjustments to the token count prediction model 558 based on the token count prediction loss data 564 include the adjustment of weight values or other aspects of those layers, such that the operations performed by those layers during future iterations are changed. By performing many such training iterations with the token count prediction model 558, the accuracy of the model 558 to generate predicted token counts 562 that closely correspond to the token counts 540 of output text data 508 is improved. In some examples, such training iterations are performed with the token count prediction model 558 until the accuracy of its performance at generating predicted token counts 562 falls within an allowable threshold of inaccuracy (e.g., the model 558 is trained until it reliably generates predicted token counts 562 that are 99.9% accurate with respect to the associated token counts 540).

It should be understood that the token count 540 of output text data 508 is the same as the token count 440 of output text data 408 as described above with respect to system 400 of FIG. 4. Further, the determination or generation of the token count 540 is performed in substantially the same way as the determination of token count 440. In some such examples, the token count 540) is a numerical value or other indicator of the quantity of tokens that are in the output text data 408.

In some examples, the training of the token count prediction model 558 is performed using token count prediction loss data 564, which is determined based on differences between the predicted token count 562 and the token count 540 of the output text data 508. The use of token count 540) as feedback data for training the token count prediction model 558 over many iterations trains the token count prediction model 558 to be able to accurately predict an appropriate or desirable quantity of tokens of output text data based on provided input text data. Further, in some such examples, the loss data 564 is a value or set of values that can be used to adjust weights and/or other values used by the token count prediction model 564 to transform input text data into a predicted token count 562. In some such examples, layers that are adjusted based on the token count prediction loss data 564 include layers configured to encode text data into data vectors, encodings, embeddings, or the like, layers configured to transform data vectors, and/or layers generate predicted token counts 562 from encoded and/or transformed data vectors. In other examples, the token count prediction model 558 includes more, fewer, or different types of layers that are adjusted based on the token count prediction loss data 564 as part of the training process without departing from the description.

Further, in some examples, the token count prediction model 558 is used in combination with the text processing model 404 of FIG. 4, such that the token count prediction model 558 uses the input encoding 559 from the encoder layers 451 of the text processing model 404 as input to the regressor 560 to generate the predicted token count 562. In this way, the system including both the text processing model 404 and the token count prediction model 558 includes a single set of encoder layers 451. In some such examples, this combined system includes training and/or fine-tuning the text processing model 404 using loss data 456 as described above and training and/or fine-tuning at least the regressor 560 of the token count prediction model 558 using the token count prediction loss data 564 as described above. Additionally, or alternatively, the encoder layers 451 of the text processing model 404 are trained and/or fine-tuned using the token count prediction loss 564 in addition to the encoder layers 451 being trained based on the loss data 456. Thus, the training of the text processing model 404 and the token count prediction model 558 are performed in parallel using the same training data entries 402 in some such examples.

Figure 6:
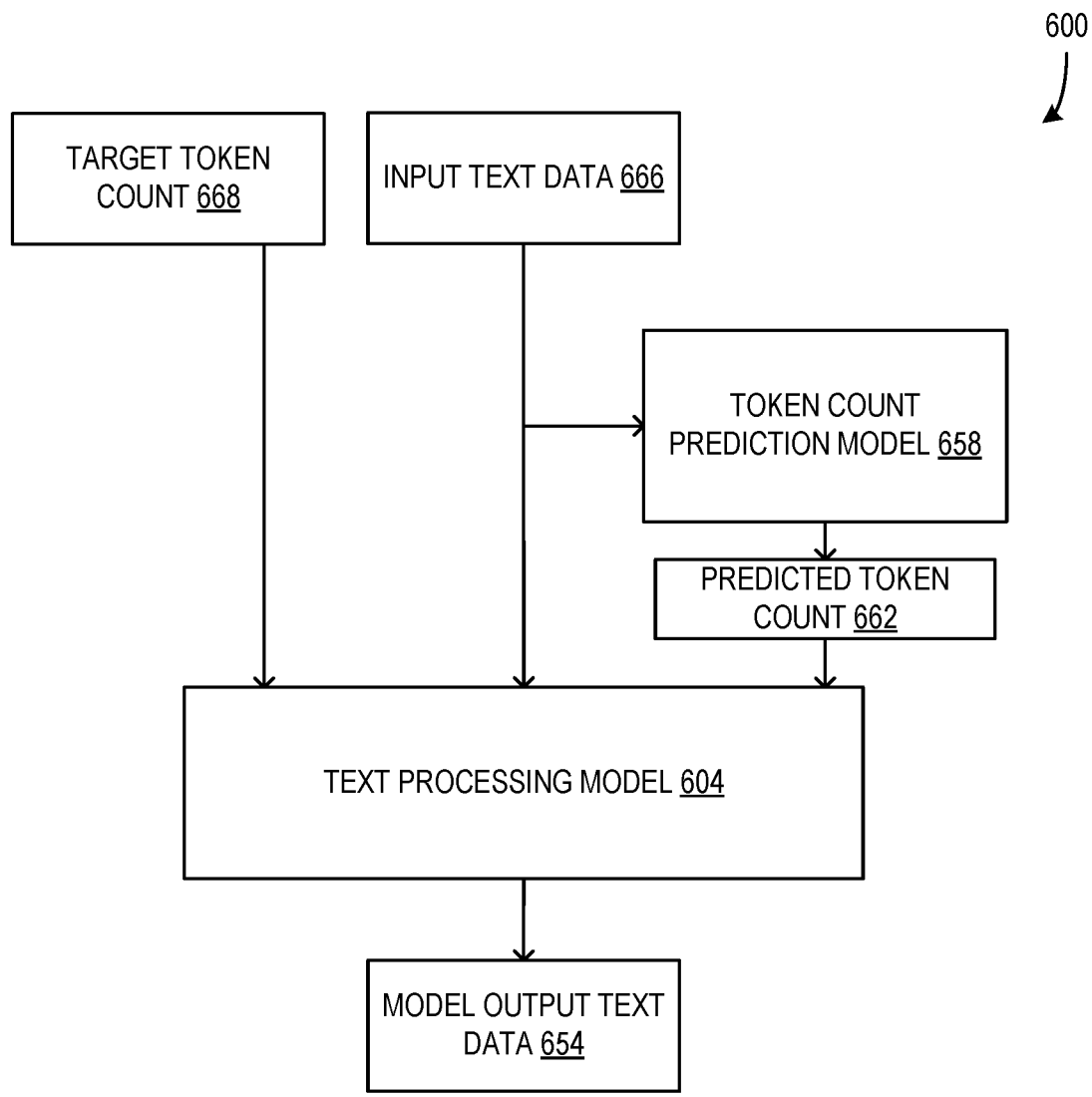
FIG. 6 is a block diagram illustrating a system configured for using a text processing model to generate model output text data using input text data and a token count.

FIG. 6 is a block diagram illustrating a system 600 configured for using a text processing model 604 to generate model output text data 654 using input text data 666 and a token count (e.g., a target token count 668 or a predicted token count 662). In some examples, the text processing model 604 has been trained as described herein with respect to the text processing model 404 of FIG. 4. Further, in some examples, the token count prediction model 658 has been trained as described herein with respect to the token count prediction model 658 of FIG. 5.

The text processing model 604 includes hardware, firmware, and/or software configured to receive input text data 666 and a token count, such as a target token count 668 or a predicted token count 662, as input and to generate model output text data 654 as described herein. In some examples, the system 600 receives a target token count 668 as input from the same source or a different source from which the input text data 666 is received and the text processing model 604 is configured to use that target token count 668. For instance, in one example, the target token count 668 is included in a request with the input text data 666 while, in another example, the target token count 668 is a defined parameter of the system 600. However, in other examples, no target token count 668 is provided and the system 600 is configured use the input text data 666 as input to the token count prediction model 658, which is configured to generate a predicted token count 662 therefrom for use as input to the text processing model 604. In still other examples, the selection of a target token count 668 or a predicted token count 662 for use with the text processing model 604 is done using other methods (e.g., a user of the system 600 selects between the two options when both are available, the system 600 prioritizes a target token count 668 over a predicted token count 662 when the target token count 668 is available, or the like). It should be understood that, in some examples, the use of a target token count 668 targets a different application of the described text processing model 604 than the use of the token count prediction model 658 to generate the predicted token count 662 and, as a result, systems configured to use a target token count 668 do not include the token count prediction model 658, while systems configured to use the token count prediction model 658 do not obtain a target token count 668 as input.

Further, in some examples, the text processing model 604 and token count prediction model 658 are combined as described above, such that the models 604 and 658 share the same encoder layers 451 to produce input encodings 559. The input encoding 559 is used by the token count prediction model 658 to generate the predicted token count 662 and by the text processing model 604 to generate the model output text data 654 using decoder layers 452. In some such examples, the generation of the model output text data 654 by the text processing model 604 uses the predicted token count 662 as input as described herein, such that the system 600 first predicts a quantity of tokens for the output and then generates model output text data 654 that includes that predicted quantity of tokens.

Figure 7:
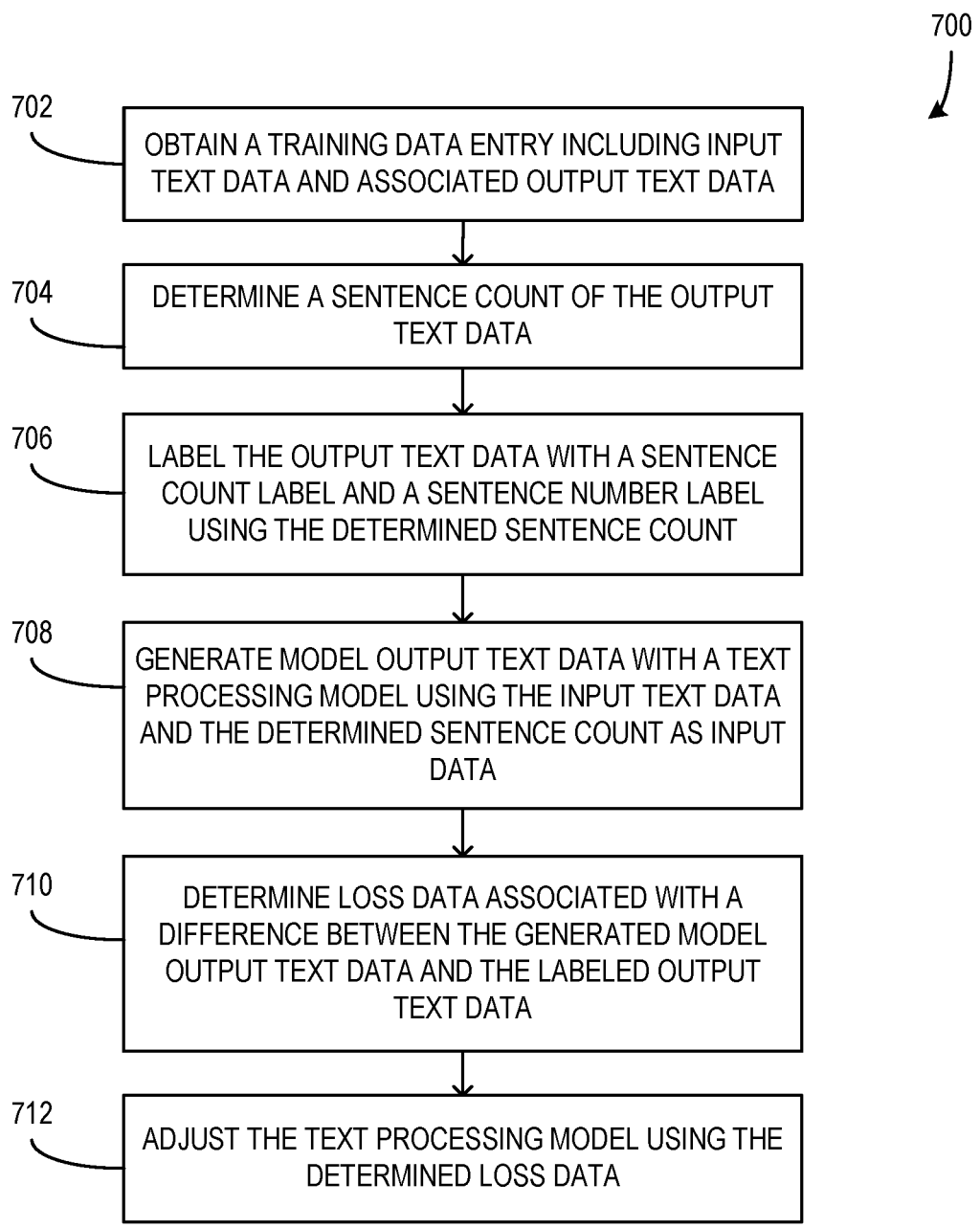
FIG. 7 is a flowchart illustrating a computerized method for training a text processing model to generate model output text data using a sentence count.

FIG. 7 is a flowchart illustrating a computerized method 700 for training a text processing model (e.g., text processing model 104) to generate model output text data (e.g., model output text data 118) using a sentence count (e.g., sentence count 110). In some examples, the method 700 is executed or otherwise performed in a system such as system 100 of FIG. 1 as described herein.

At 702, a training data entry (e.g., training data entry 102) that includes input text data (e.g., input text data 106) and associated output text data (e.g., output text data 108) is obtained. In some examples, the input text data includes the text of an article, paper, book, or other body of text and the associated output text data includes summary text of the input text data and/or translated text of the input text data. Further, in some examples, obtaining the training data entry includes accessing the training data from a database or other data structure that stores a plurality of training data entries during an iterative model training process as described herein.

At 704, a sentence count of the output text data is determined, wherein the sentence count is a value that is indicative of the quantity of sentences that are present in the text of the output text data. In some examples, determining the sentence count includes identifying characters, text or character patterns, or the like in the text of the output text data to identify the beginnings or ends of sentences within the text (e.g., periods, exclamation marks, question marks, or other punctuation are identified within the text to identify boundaries between sentences).

At 706, the output text data is labeled with a sentence count label (e.g., sentence count label 114) and a sentence number label (e.g., sentence number label 116) using the determined sentence count. In some examples, the sentence count label is configured to indicate the quantity of sentences in the output text data (e.g., the determined sentence count) while the sentence number label(s) are configured to indicate a specific sentence number within the text of the output text data relative to the beginning of the text. Further, in some examples, labeling the output text data with the labels includes inserting special characters and associated numeric values at positions within the output text data as described herein, as described above with respect to system 100 of FIG. 1. For instance, in an example, the sentence count label is inserted into the output text data at the beginning of the text while the sentence number label(s) are inserted into the output text data at the beginning of each sentence of the text.

At 708, model output text data (e.g., generated model output text data 118) is generated with a text processing model (e.g., text processing model 104) using the input text data and the determined sentence count as input data. In some examples, the text processing model is a model trained by machine learning techniques and/or includes encoder layers, decoder layers, and/or other types of transformer layers as described herein. In some such examples, the model output text data is generated by encoding the input text data using a series of encoding layers and then decoding the resulting encoded data using a series of decoding layers to generate the model output text data as described herein.

At 710, loss data (e.g., loss data 120) associated with a difference between the generated model output text data and the labeled output text data is determined. In some examples, the loss data is determined using a loss function of the text processing model based on machine learning techniques. In some such examples, the loss data includes value(s) that are indicative of the degree to which the model output text data and the labeled output text data differ, where larger values in the loss data indicate more significant differences between the model output text data and the labeled output text data and smaller values in the loss data indicate less significant differences between the model output text data and the labeled output text data.

At 712, the text processing model is adjusted using the determined loss data. In some examples, the adjustment of the text processing model includes adjusting weights and/or other aspects of the layers of the text processing model, including adjustment of encoder layers, decoder layers, or other types of transformer layers as described herein.

Further, in some examples, the method 700 includes training a sentence count prediction model (e.g., sentence count prediction model 222). The training of the sentence count prediction model includes generating a predicted sentence count (e.g., predicted sentence count 224) using the input text data (e.g., input text data 206) as input data and determining sentence count prediction loss data (e.g., sentence count prediction loss data 226) associated with a difference between the generated predicted sentence count and the determined sentence count (e.g., sentence count 210). The sentence count prediction loss data is then used to adjust the sentence count prediction model, including adjusting weights and/or other aspects of various layers of the model as described herein. It should be understood that, in some examples, the training of the sentence count prediction model is performed as described above with respect to system 200 of FIG. 2.

Additionally, in some examples, the text processing model and the sentence count prediction model share an encoder layer or layers that are configured for generating input encoding using the input text data. The resulting input encoding is then used by decoders of the text processing model to generate the model output text data while the sentence count prediction model uses the input encoding to generate the predicted sentence count. In some such examples, the training of the two models, including the adjustment of the text processing model using the determined loss data and the adjustment of the sentence count prediction model using the determined sentence count prediction loss data, are performed in parallel.

In some examples, the method 700 is followed by the use of the trained text processing model and/or the trained sentence count prediction model as described herein. For instance, in some examples, the method 700 is followed by the method 800 of FIG. 8 as described below. In some such examples, the sentence count provided to the text processing model as input is generated by the sentence count prediction model based on using input text data as input data, as described herein. The text processing model and sentence count prediction model either operate separately in the same system, or they are configured to share encoder layers as described herein, such that the shared encoder layers generate the input encoding, the input encoding is used by the sentence count prediction model to generate the predicted sentence count, and the predicted sentence count is used by the text processing model in generation of the model output text data as described herein.

Alternatively, or additionally, in some examples, the trained text processing model is used to generate the model output text data using the input text data and a target sentence count as input, wherein the target sentence count was not generated by the sentence count prediction model. In such examples, the target sentence count is provided to the text processing model by a user of the system, from the source of the input text data, from a setting or parameter of the system or the like. In some such examples, if a target sentence count is provided, it is prioritized over the use of a predicted sentence count from the sentence count prediction model. In other examples, other methods are used to determine which sentence count to use without departing from the description.

Figure 8:
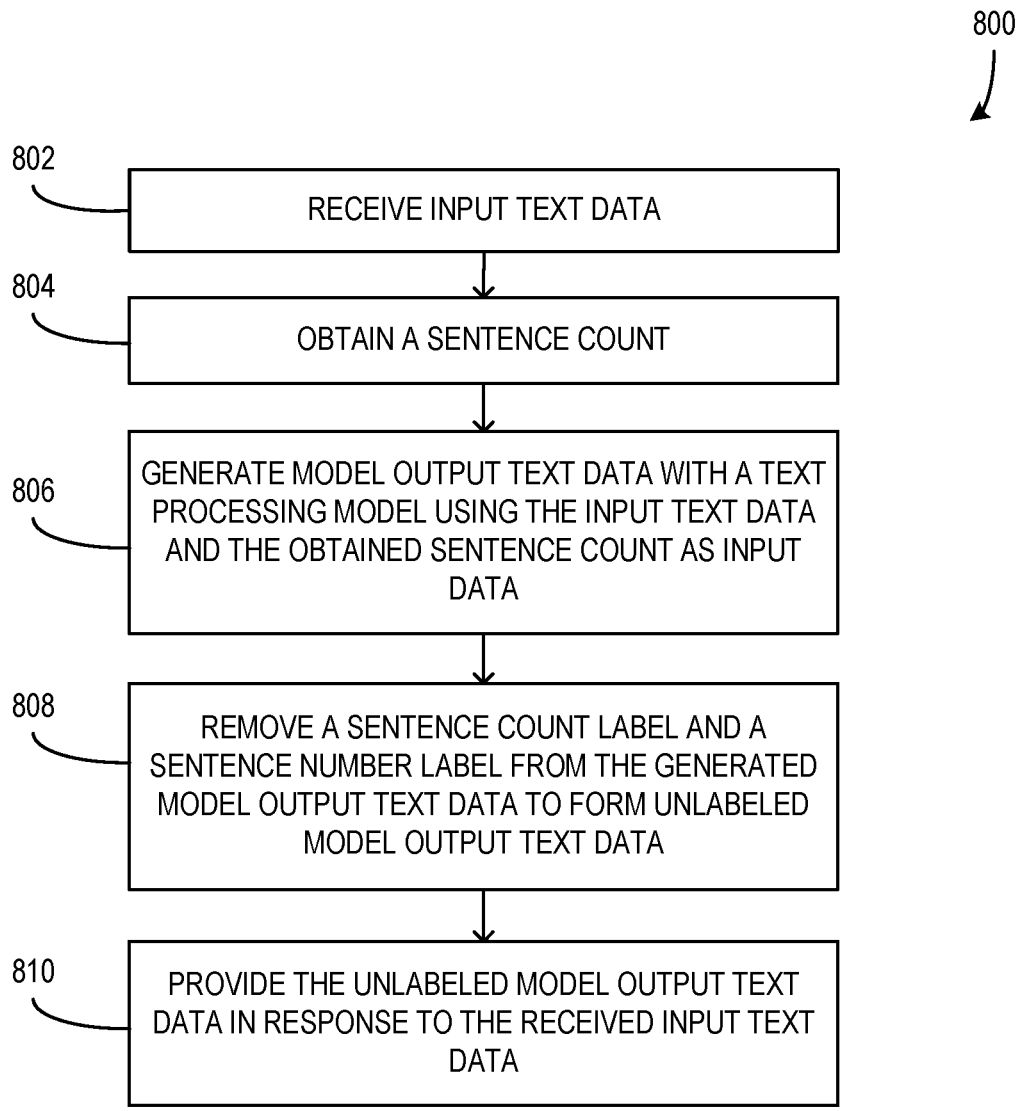
FIG. 8 is a flowchart illustrating a computerized method for using a text processing model to generate unlabeled model output text data using input text data and a sentence count.

FIG. 8 is a flowchart illustrating a computerized method 800 for using a text processing model (e.g., text processing model 304) to generate unlabeled model output text data (e.g., unlabeled model output text data 338) using input text data (e.g., input text data 328) and a sentence count (e.g., target sentence count 330) and/or predicted sentence count 324). In some examples, the method 800 is executed or otherwise performed in a system such as system 300 of FIG. 3 as described herein.

At 802, input text data is received and, at 804, a sentence count is obtained. In some examples, the input text data is received as part of a request to the system for generation and provision of the unlabeled model output text data. For instance, in an example, the input text data includes an article and is part of a request for the generation and provision of a summary of the article. Further, in some examples, the sentence count is obtained as a target sentence count (e.g., target sentence count 330) from the source of the request or from another source, such as a default sentence count parameter of the system. Alternatively, or additionally, obtaining the sentence count includes generating a predicted sentence count (e.g., predicted sentence count 324) using a sentence count prediction model (e.g., sentence count prediction model 322) as described herein.

At 806, model output text data (e.g., model output text data 332) is generated with the text processing model using the input text data and the obtained sentence count as input data. In some examples, the generated model output text data includes a sentence count label (e.g., sentence count label 334) and a sentence number label (e.g., sentence number label 336), wherein the sentence count label is based on the obtained sentence count used as input data. Because the sentence count used as input data is indicative of a total quantity of sentences to be used in the model output text data, the sentence count label includes a numeric value that is equal to the obtained sentence count in most examples. Further, the sentence number label is indicative of the relative position of the associated sentence within the generated model output text data, as described herein with respect to at least FIGS. 1 and 3.

At 808, the sentence count label and the sentence number label are removed from the generated model output text data to form unlabeled model output text data and, at 810, the unlabeled model output text data is provided in response to the received input text data.

It should be understood that, in some examples, the method 800 includes the use of shared encoder layers between the text processing model and the sentence count prediction model as described above with respect to at least method 700 of FIG. 7. In such examples, the input encoding is used by the sentence count prediction model to generate the predicted sentence count that is used as input to the text processing model and the text processing model uses the input encoding with the predicted sentence count to generate the model output text data as described herein.

Further, in some examples, the method 800 and the associated text processing model are configured and/or trained to generate unlabeled model output text data that is a summary of the input text data and/or a translation of the input text data, as described herein.

Figure 9:
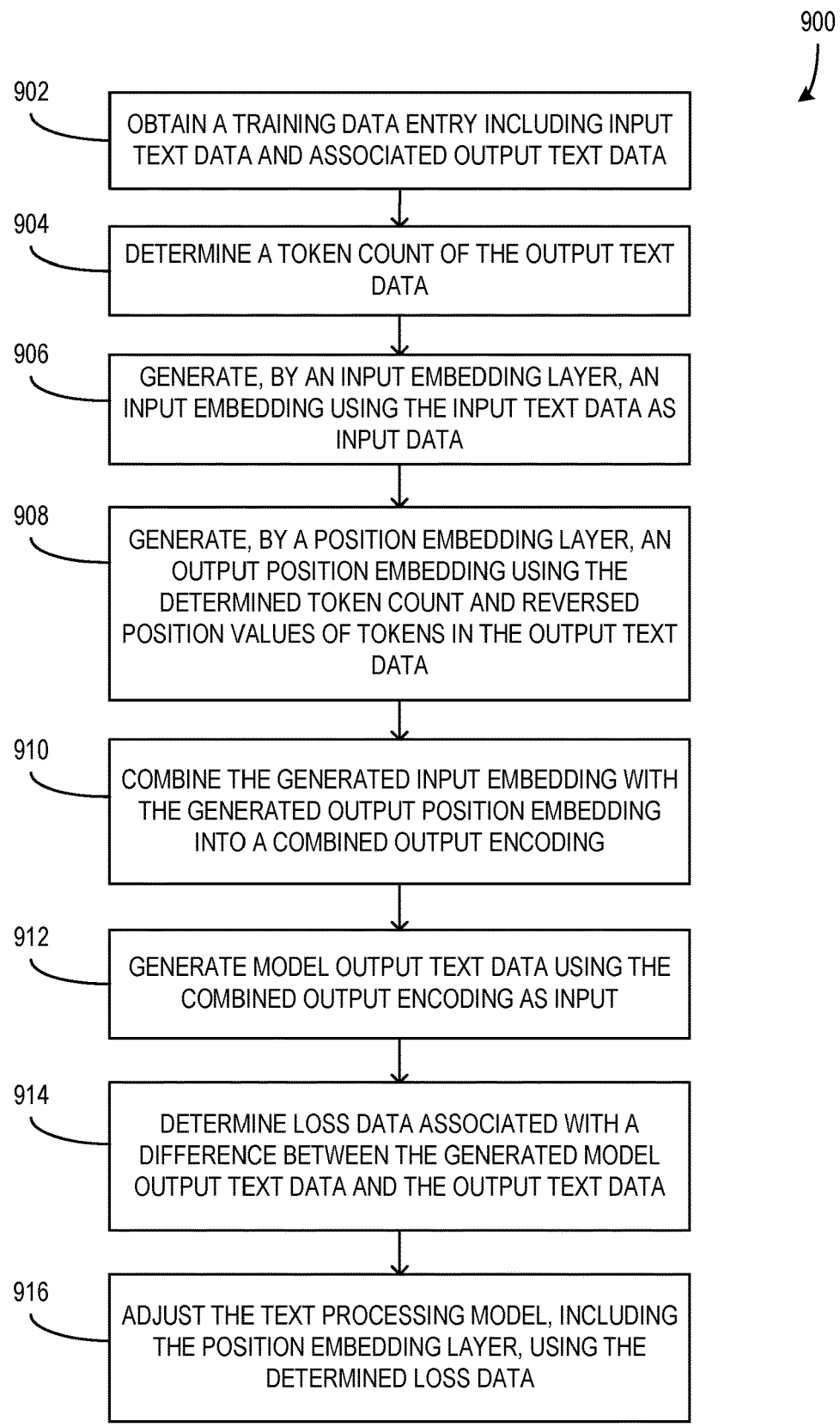
FIG. 9 is a flowchart illustrating a computerized method for training a text processing model to generate model output text data using a token count.

FIG. 9 is a flowchart illustrating a computerized method 900 for training a text processing model (e.g., text processing model 404) to generate model output text data (e.g., model output text data 454) using a token count (e.g., token count 440). In some examples, the method 900 is executed or otherwise performed in a system such as system 400 of FIG. 4 as described herein.

At 902, a training data entry (e.g., training data entry 402) that includes input text data (e.g., input text data 406) and associated output text data (e.g., output text data 408) is obtained. In some examples, the input text data includes the text of an article, paper, book, or other body of text and the associated output text data includes summary text of the input text data and/or translated text of the input text data. Further, in some examples, obtaining the training data entry includes accessing the training data from a database or other data structure that stores a plurality of training data entries during an iterative model training process as described herein.

At 904, a token count of the output text data is determined, wherein the token count is a value that is indicative of the quantity of tokens that are present in the text of the output text data, wherein tokens are letters, groups of letters, words, symbols, or the like that make up text data and that are associated with defined token values in a token lookup table or other data structure. In some examples, determining the token count includes identifying tokens in the text and counting the identified tokens to obtain the token count.

At 906, an input encoding (e.g., input embedding 444) is generated with encoder layer(s) (e.g., encoder layers 451) of the text processing model using the input text data as input data. It should be understood that, in some examples, the generation of the input encoding is performed in substantially the same way as described above with respect to the input embedding 444 and encoder layers 442 of system 400 of FIG. 4. In some examples, the input encoding includes data vectors that are representative of the tokens of the input text data as described herein.

At 908, an output position embedding is generated by a position embedding layer of the text processing model using the determined token count and reversed position values of tokens in the output text data. In some examples, the reversed position values of tokens in the output text data include position values that start with the determined token count as the position value of the first token and decrement by one for each following token until a position value of one is reached (e.g., a determined token count of 5 results in reversed position values of "5, 4, 3, 2, 1"). The position embedding layer transforms the reversed position values or otherwise generates the output position embedding from the reversed position values as described herein with respect to the position embedding layer 446 of FIG. 4. In some examples, the resulting output position embedding includes data vectors that are representative of the reversed position values.

At 910, the generated input encoding and the generated output position embedding are combined into a combined output encoding (e.g., the combined output encoding 450). In some examples, data vectors of the input encoding are added to the data vectors of the output position embedding. Alternatively, in other examples, the input encoding and the output position embedding are combined in some other manner without departing from the description.

At 912, model output text data (e.g., model output text data 454) is generated with decoder layers (e.g., decoder layers 452) of the text processing model using the combined output encoding as input data. In some examples, the generation of the model output text data is performed in substantially the same way as described above with respect to decoder layers 452 and model output text data 454 of FIG. 4.

At 914, loss data (e.g., loss data 456) associated with a difference between the generated model output text data (e.g., model output text data 454) and the output text data (e.g., output text data 408) is determined. In some examples, the loss data is determined using a loss function of the text processing model based on machine learning techniques. In some such examples, the loss data includes value(s) that are indicative of the degree to which the model output text data and the output text data differ, where larger values in the loss data indicate more significant differences between the model output text data and the output text data and smaller values in the loss data indicate less significant differences between the model output text data and the output text data.

At 916, the text processing model, including the position embedding layer, is adjusted using the determined loss data. In some examples, the adjustment of the text processing model further includes adjusting weights and/or other aspects of the encoder layers and/or the decoder layers of the text processing model, as described herein with respect to at least system 400 of FIG. 4.

Further, in some examples, the method 900 includes training a token count prediction model (e.g., token count prediction model 558). The training of the token count prediction model includes generating a predicted token count (e.g., predicted token count 562) using the input text data (e.g., input text data 506) as input data and determining token count prediction loss data (e.g., token count prediction loss data 564) associated with a difference between the generated predicted token count and the determined token count (e.g., token count 540)). The token count prediction loss data is then used to adjust the token count prediction model, including adjusting weights and/or other aspects of various layers of the model as described herein. It should be understood that, in some examples, the training of the sentence count prediction model is performed as described above with respect to system 500 of FIG. 5.

Additionally, in some examples, the text processing model and the token count prediction model share an encoder layer or layers that are configured for generating input encoding using the input text data. The resulting input encoding is then used by decoders of the text processing model to generate the model output text data while the token count prediction model uses the input encoding to generate the predicted token count. In some such examples, the training of the two models, including the adjustment of the text processing model using the determined loss data and the adjustment of the token count prediction model using the determined token count prediction loss data, are performed in parallel.

In some examples, the method 900 is followed by the use of the trained text processing model (e.g., text processing model 604) and/or the trained token count prediction model (e.g., token count prediction model 658) as described herein with respect to at least system 600 of FIG. 6. In some such examples, the token count provided to the text processing model as input is generated by the token count prediction model based on using input text data as input data, as described herein. The text processing model and token count prediction model either operate separately in the same system, or they are configured to share encoder layers as described herein, such that the shared encoder layers generate the input encoding, the input encoding is used by the token count prediction model to generate the predicted token count (e.g., predicted token count 662), and the predicted token count is used by the text processing model in generation of the model output text data (e.g., model output text data 654) as described herein.

Alternatively, or additionally, in some examples, the trained text processing model is used to generate the model output text data using the input text data and a target token count (e.g., target token count 668) as input, wherein the target token count was not generated by the token count prediction model. In such examples, the target token count is provided to the text processing model by a user of the system, from the source of the input text data, from a setting or parameter of the system, or the like. In some such examples, if a target token count is provided, it is prioritized over the use of a predicted token count from the token count prediction model. In other examples, other methods are used to determine which token count to use without departing from the description.

Further, in some examples, generating the input encoding using the input text data includes generating a token embedding (e.g., using an input embedding layer 442) and generating an input position embedding by the position embedding layer using reversed position values of the tokens of the input text data. The generated token embedding and the generated input position embedding are combined into a combined input encoding and the input encoding is generated by the set of encoder layers of the text processing model using the combined input encoding as input data. In some such examples, the use of the input position embedding data during the generation of the token embedding is performed as described herein with respect to at least system 400 of FIG. 4.

Exemplary Operating Environment

The present disclosure is operable with a computing apparatus according to an embodiment as a functional block diagram 1000 in FIG. 10. In an example, components of a computing apparatus 1018 are implemented as a part of an electronic device according to one or more embodiments described in this specification. The computing apparatus 1018 comprises one or more processors 1019 which may be microprocessors, controllers, or any other suitable type of processors for processing computer executable instructions to control the operation of the electronic device. Alternatively, or in addition, the processor 1019 is any technology capable of executing logic or instructions, such as a hardcoded machine. In some examples, platform software comprising an operating system 1020 or any other suitable platform software is provided on the apparatus 1018 to enable application software 1021 to be executed on the device. In some examples, training and using text processing models to generate model output text data as described herein is accomplished by software, hardware, and/or firmware.

In some examples, computer executable instructions are provided using any computer-readable media that are accessible by the computing apparatus 1018. Computer-readable media include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that, in some examples, the storage is distributed or located remotely and accessed via a network or other communication link (e.g., using a communication interface 1023).

Further, in some examples, the computing apparatus 1018 comprises an input/output controller 1024 configured to output information to one or more output devices 1025, for example a display or a speaker, which are separate from or integral to the electronic device. Additionally, or alternatively, the input/output controller 1024 is configured to receive and process an input from one or more input devices 1026, for example, a keyboard, a microphone, or a touchpad. In one example, the output device 1025 also acts as the input device. An example of such a device is a touch sensitive display. The input/output controller 1024 may also output data to devices other than the output device, e.g., a locally connected printing device. In some examples, a user provides input to the input device(s) 1026 and/or receives output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a key board or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: obtain a training data entry including input text data and associated output text data: determine a sentence count of the output text data: label the output text data with a sentence count label and a sentence number label using the determined sentence count: generate model output text data with a text processing model using the input text data and the determined sentence count as input data: determine loss data associated with a difference between the generated model output text data and the labeled output text data, wherein the difference includes a difference associated with at least one of the sentence count label and the sentence number label of the labeled output text data; and adjust the text processing model using the determined loss data, whereby the text processing model is fine-tuned using the obtained training data entry.

An example computerized method comprises: receiving input text data; obtaining a sentence count: generating model output text data with a text processing model using the input text data and the obtained sentence count as input data: removing a sentence count label and a sentence number label from the generated model output text data to form unlabeled model output text data; and providing the unlabeled model output text data in response to the received input text data.

One or more computer storage media having computer-executable instructions that, upon execution by a processor, cause the processor to at least: obtain a training data entry including input text data and associated output text data: determine a token count of the output text data: generate, by an input embedding layer of a text processing model, an input embedding using the input text data as input data: generate, by a position embedding layer, an output position embedding using the determined token count and reversed position values of tokens in the output text data: combine the generated input embedding with the generated output position embedding into a combined output encoding: generate, by an encoder layer and a decoder layer of the text processing model, model output text data using the combined output encoding as input data: determine loss data associated with a difference between the generated model output text data and the output text data; and adjust the text processing model, including the position embedding layer, using the determined loss data, whereby the text processing model is fine-tuned using the obtained training data entry.

Alternatively, or in addition to the other examples described herein, examples include any combination of the following:
wherein the memory and the computer program code are configured to, with the processor, further cause the processor to: generate a predicted sentence count with a sentence count prediction model using the input text data as input data: determine sentence count prediction loss data associated with a difference between the generated predicted sentence count and the determined sentence count; and adjust the sentence count prediction model using the determined sentence count prediction loss data.
wherein the text processing model and the sentence count prediction model share an encoder layer configured for generating input encoding using the input text data; and wherein the text processing model uses the input encoding to generate model output text data and the sentence count prediction model uses the input encoding to generate the predicted sentence count.
wherein adjusting the text processing model using the determined loss data and adjusting the sentence count prediction model using the determined sentence count prediction loss data are performed in parallel.
wherein the memory and the computer program code are configured to, with the processor, further cause the processor to: receive second input text data: generate a second predicted sentence count with the sentence count prediction model using the second input text data as input data: generate second model output text data with the text processing model using the second input text data and the generated second predicted sentence count as input data: remove a sentence count label and a sentence number label from the generated second model output text data to form unlabeled model output text data; and provide the unlabeled model output text data in response to the received second input text data.
wherein the memory and the computer program code are configured to, with the processor, further cause the processor to: receive second input text data and a target sentence count: generate second model output text data with the text processing model using the second input text data and the received target sentence count as input data; remove a sentence count label and sentence number labels from the generated second model output text data to form unlabeled model output text data; and provide the unlabeled model output text data in response to the received second input text data.
wherein labeling the output text data includes: inserting a special character and the determined sentence count at a beginning of the output text data as the sentence count label: determining a sentence number value of a sentence in the output text data using a position of the sentence in the output text data relative to the beginning of the output text data; and inserting the special character and the determined sentence number value at a beginning of the sentence as sentence number label of the sentence number labels.
wherein the output text data of the training data entry is at least one of a summary of the input text data and a translation of the input text data.

wherein obtaining the sentence count includes generating the sentence count with a sentence count prediction model using the input text data as input data.

wherein the text processing model and the sentence count prediction model share an encoder layer configured for generating input encoding using the input text data; and wherein the text processing model uses the input encoding to generate model output text data and the sentence count prediction model uses the input encoding to generate the predicted sentence count.

wherein the unlabeled model output text data is at least one of a summary of the input text data and a translation of the input text data.

wherein generating the input encoding using the input text data as input data includes: generating a token embedding using tokens of the input text data; and wherein combining the generated input embedding with the generated output position embedding into a combined output encoding includes: combining the generated token embedding and the generated position embedding into a combined input encoding.

wherein the computer-executable instructions, upon execution by a processor, further cause the processor to at least: generate a predicted token count with a token count prediction model using the input text data as input data: determine token count prediction model loss data associated with a difference between the generated predicted token count and the determined token count; and adjust the token count prediction model using the determined token count prediction model loss data.

wherein the text processing model and the token count prediction model share the encoder layer configured for generating input encoding using the input text data; and wherein the text processing model uses the input encoding to generate model output text data and the token count prediction model uses the input encoding to generate the predicted token count.

wherein adjusting the text processing model using the determined loss data and adjusting the token count prediction model using the determined token count prediction model loss data are performed in parallel.

wherein the computer-executable instructions, upon execution by a processor, further cause the processor to at least: receive second input text data: generate a second predicted token count with the token count prediction model using the second input text data as input data: generate second model output text data with the text processing model using the second input text data and the generated second predicted token count as input data; and provide the second model output text data in response to the received second input text data.

wherein the computer-executable instructions, upon execution by a processor, further cause the processor to at least: receive second input text data and a target token count; generate second model output text data with the text processing model using the second input text data and the received target token count as input data; and provide the second model output text data in response to the received second input text data.

wherein the output text data of the training data entry is at least one of a summary of the input text data and a translation of the input text data.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining a training data entry including input text data and associated output text data: exemplary means for determining a sentence count of the output text data; exemplary means for labeling the output text data with a sentence count label and a sentence number label using the determined sentence count: exemplary means for generating model output text data with a text processing model using the input text data and the determined sentence count as input data: exemplary means for determining loss data associated with a difference between the generated model output text data and the labeled output text data, wherein the difference includes a difference associated with at least one of the sentence count label and the sentence number label of the labeled output text data; and exemplary means for adjusting the text processing model using the determined loss data, whereby the text processing model is fine-tuned using the obtained training data entry.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
  a processor; and
  a memory comprising computer program code for execution by the processor, wherein the computer program code, when executed by the processor, causes the system to:
  obtain input text data and associated output text data;
  determine a sentence count of the output text data, wherein the sentence count indicates a number of sentences within the output text data;
  label the output text data with a sentence count label and a sentence number label using the determined sentence count; and
  iteratively train a text processing machine learning (ML) model over multiple training iterations based on training data that includes the input text data, the output text data, and the sentence count, wherein iteratively training the text processing ML model includes, during each of the multiple training iterations, training the text processing ML model to generate model output text data from the input text data based on the sentence count, determining loss data based on a difference between the model output text data and the output text data, and adjusting weight values of the text processing ML model using the determined loss data.

2. The system of claim 1, wherein the computer program code, when executed by the processor, further causes the system to:
  iteratively train a sentence count prediction ML model over the multiple training iterations based on the training data, wherein iteratively training the sentence count prediction ML model includes, during each of the multiple training iterations, training the sentence count prediction ML model to predict a sentence count of the model output text data generated by the text processing ML model, determining sentence count prediction loss data based on a difference between the predicted sentence count and an actual sentence count of the model output text data generated by the text processing ML model, and adjusting weight values of the sentence count prediction ML model using the determined sentence count prediction loss data.

3. The system of claim 2, wherein the text processing ML model and the sentence count prediction ML model share an encoder layer, and
  wherein, during each of the multiple training iterations, the text processing ML model uses the encoder layer to generate model output text data and the sentence count prediction ML model uses the encoder layer to predict the sentence count of the model output text data generated by the text processing ML model.

4. The system of claim 2, wherein the weight values of the text processing ML model and the weight values of the sentence count prediction ML model are adjusted in parallel.

5. The system of claim 1, wherein labeling the output text data includes:
  inserting a special character and the determined sentence count at a beginning of the output text data as the sentence count label;
  determining a sentence number value of a sentence in the output text data using a position of the sentence in the output text data relative to the beginning of the output text data; and
  inserting the special character and the determined sentence number value at a beginning of the sentence as sentence number label of the sentence number labels.

6. The system of claim 1, wherein the output text data both translates and summarizes the input text data such that the output text data is in a different language and of a shorter length than the input text data.

7. One or more computer storage media having computer-executable instructions that, upon execution by a processor of a system, cause the system to at least:
  obtain input text data and associated output text data;
  determine a token count of the output text data, wherein the token count indicates a number of tokens in the output text data;
  determine reverse position values of the tokens in the output text data, wherein the reverse position values of the tokens in the output text data indicate positions of the tokens in the output text data in a reverse order;
  iteratively train a text processing machine learning (ML) model over multiple training iterations based on training data that includes the input text data, the output text data, the token count, and the reverse position values, wherein iteratively training the text processing ML model includes, during each of the multiple training iterations, training the text processing ML model to generate model output text data from the input text data based on the reverse position values, determining loss data based on a difference between the model output text data and the output text data, and adjusting weight values of the text processing ML model using the determined loss data.

8. The one or more computer storage media of claim 7, wherein the computer-executable instructions, upon execution by the processor, further cause the system to:
  iteratively train a token count prediction ML model over the multiple training iterations based on the training data, wherein iteratively training the token count prediction ML model includes, during each of the multiple training iterations, training the token count prediction ML model to predict a token count of the model output text data generated by the text processing ML model, determining token count prediction model loss data based on a difference between the predicted token count and an actual token count of the model output text data generated by the text processing ML model, and adjusting weight values of the token count prediction ML model using the determined token count prediction model loss data.

9. The one or more computer storage media of claim 8, wherein the text processing ML model and the token count prediction ML model share an encoder layer, and
  wherein, during each of the multiple training iterations, the text processing ML model uses the encoder layer to generate the model output text data and the token count prediction ML model uses the encoder layer to predict token count of the model output text data generated by the text processing ML model.

10. The one or more computer storage media of claim 8, wherein the weight values of text processing model and the weight values of the token count prediction model are adjusted in parallel.

11. The one or more computer storage media of claim 7, wherein the output text data both translates and summarizes the input text data such that the output text data is in a different language and of a shorter length than the input text data.

12. The one or more computer storage media of claim 7, wherein training the text processing ML model to generate the model output text data during each of the multiple training iterations includes training an input embedding layer of the text processing ML model to generate an input embedding based on the input text data, training a position embedding layer of the text processing ML model to generate an output position embedding based on the token count and the reverse position values, and training encoding/decoding layers of the text processing ML model to generate the model output text based on the input embedding and the output position embedding.

13. The one or more computer storage media of claim 7, wherein adjusting the weight values of the text processing ML model using the determined loss data comprises adjusting weight values of a position embedding layer of the text processing ML model using the loss data, the reverse position values being an input to the position embedding layer when training the text processing ML model to generate the model output text data from the input text data.

14. A method comprising:
obtaining input text data and associated output text data;
determining a sentence count of the output text data, wherein the sentence count indicates a number of sentences within the output text data;
labeling the output text data with a sentence count label and a sentence number label using the determined sentence count; and
iteratively training a text processing machine learning (ML) model over multiple training iterations based on training data that includes the input text data, the output text data, and the sentence count, wherein iteratively training the text processing ML model includes, during each of the multiple training iterations, training the text processing ML model to generate model output text data from the input text data based on the sentence count, determining loss data based on a difference between the model output text data and the output text data, and adjusting weight values of the text processing ML model using the determined loss data.

15. The method of claim 14, further comprising:
iteratively training a sentence count prediction ML model over the multiple training iterations based on the training data, wherein iteratively training the sentence count prediction ML model includes, during each of the multiple training iterations, training the sentence count prediction ML model to predict a sentence count of the model output text data generated by the text processing ML model, determining sentence count prediction loss data based on a difference between the predicted sentence count and an actual sentence count of the model output text data generated by the text processing ML model, and adjusting weight values of the sentence count prediction ML model using the determined sentence count prediction loss data.

16. The method of claim 15, wherein the text processing ML model and the sentence count prediction ML model share an encoder layer, and
wherein, during each of the multiple training iterations, the text processing ML model uses the encoder layer to generate the model output text data and the sentence count prediction ML model uses the encoder layer to predict the sentence count of the model output text data generated by the text processing ML model.

17. The method of claim 15, wherein the weight values of the text processing ML model and the weight values of the sentence count prediction ML model are adjusted in parallel.

18. The method of claim 14, wherein the output text data both translates and summarizes the input text data such that the output text data is in a different language and has a shorter length than the input text data.

* * * * *